(12) United States Patent
Takano

(10) Patent No.: US 9,371,106 B2
(45) Date of Patent: Jun. 21, 2016

(54) VEHICLE

(71) Applicant: Yamaha Hatsudoki Kabushiki Kaisha, Iwata-shi, Shizuoka (JP)

(72) Inventor: Kazuhisa Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/651,779

(22) PCT Filed: Dec. 19, 2013

(86) PCT No.: PCT/JP2013/084148
§ 371 (c)(1),
(2) Date: Jun. 12, 2015

(87) PCT Pub. No.: WO2014/098198
PCT Pub. Date: Jun. 26, 2014

(65) Prior Publication Data
US 2015/0344091 A1     Dec. 3, 2015

(30) Foreign Application Priority Data

Dec. 19, 2012 (JP) ................................ 2012-277219
Dec. 19, 2012 (JP) ................................ 2012-277220

(51) Int. Cl.
*B62K 5/08*     (2006.01)
*B62K 5/10*     (2013.01)
(Continued)

(52) U.S. Cl.
CPC . *B62K 5/08* (2013.01); *B62K 5/027* (2013.01); *B62K 5/05* (2013.01); *B62K 5/10* (2013.01); *B62K 21/00* (2013.01); *B62K 25/08* (2013.01); *B62K 2202/00* (2013.01)

(58) Field of Classification Search
CPC .................................. B62K 5/027; B62K 5/05
USPC ......................................... 180/210, 216, 217
See application file for complete search history.

(56) References Cited

U.S. PATENT DOCUMENTS 4,740,004 A * 4/1988 McMullen ............... B62K 5/05
                                                      280/124.103
D547,242 S    7/2007 Lambri
(Continued)

FOREIGN PATENT DOCUMENTS

EP    1 155 950 A2    11/2001
EP    2 399 811 A1    12/2011
(Continued)

OTHER PUBLICATIONS

Official Communication issued in International Patent Application No. PCT/JP2013/084148, mailed on Apr. 1, 2014.
(Continued)

*Primary Examiner* — Kevin Hurley
(74) *Attorney, Agent, or Firm* — Keating and Bennett, LLP

(57) ABSTRACT

A vehicle includes a body frame that leans and two front wheels that prevent enlargement of a peripheral construction around a steering shaft above the two front wheels while maintaining a function of a link mechanism. An upper cross portion and a lower cross portion of the link mechanism each include a portion supported at a right end portion and a left end portion thereof and supported on a body frame at a middle portion thereof. The upper cross portion and the lower cross portion preferably have different volumes. Upper displacements that result when a rearward test force is exerted on an upper right bearing and an upper left bearing that support the upper cross portion with the lower cross portion removed, and lower displacements that result when a rearward test force is exerted on a lower right bearing and a lower left bearing that support the lower cross portion with the upper cross portion removed are equal or substantially equal.

13 Claims, 8 Drawing Sheets

(51) Int. Cl.
*B62K 25/08* (2006.01)
*B62K 5/05* (2013.01)
*B62K 21/00* (2006.01)
*B62K 5/027* (2013.01)

(56) References Cited

U.S. PATENT DOCUMENTS

| | | | |
|---|---|---|---|
| 8,991,542 B2* | 3/2015 | Yu | B62K 5/027 180/209 |
| 2004/0140645 A1 | 7/2004 | Hayashi | |
| 2005/0012291 A1 | 1/2005 | Bagnoli | |
| 2005/0167174 A1 | 8/2005 | Marcacci | |
| 2008/0164085 A1* | 7/2008 | Cecinini | B60G 21/007 180/210 |
| 2013/0168944 A1* | 7/2013 | Bartolozzi | B60G 3/01 280/269 |
| 2015/0239522 A1* | 8/2015 | Iizuka | B62K 5/027 280/267 |
| 2015/0259027 A1* | 9/2015 | Takano | B62K 5/05 280/267 |
| 2015/0291241 A1* | 10/2015 | Takano | B62K 5/05 280/5.509 |
| 2015/0298736 A1* | 10/2015 | Sasaki | B62J 15/00 280/124.103 |
| 2015/0321721 A1* | 11/2015 | Sasaki | B62K 5/05 180/210 |
| 2015/0344097 A1* | 12/2015 | Iizuka | B62K 19/38 280/62 |

FOREIGN PATENT DOCUMENTS

| | | |
|---|---|---|
| JP | 2002-337779 A | 11/2002 |
| JP | 2004-359232 A | 12/2004 |
| JP | 2005-313876 A | 11/2005 |
| JP | 2010-228551 A | 10/2010 |
| JP | 2011-195099 A | 10/2011 |
| WO | 2012/007819 A1 | 1/2012 |

OTHER PUBLICATIONS

Piaggio, "Catalogo Parti Di Ricambio", NTRC000U01, MP3 300 ie LT Mod. ZAPM64102, 116 pages.
Takano; "Vehicle"; U.S. Appl. No. 14/652,835, filed Jun. 17, 2015.
Takano: "Vehicle"; U.S. Appl. No. 14/652,832, filed Jun. 17, 2015.
Official Communication issued in corresponding Columbian Patent Application No. 15-143281—7, mailed on Mar. 8, 2016.

* cited by examiner

VEHICLE

BACKGROUND OF THE INVENTION

1. Field of the Invention

The present invention relates to a vehicle that includes a body frame that can lean, and two front wheels.

2. Description of the Related Art

A known vehicle includes a body frame that leans to the left or right when the vehicle is cornering and two front wheels that are aligned in a left-and-right direction of the body frame (for example, refer to Japanese Patent Unexamined publication JP-A-2005-313876; U.S. Design Pat. D547,242S; and Catalogo partidi ricambio, MP3 300 64102 ie LT Mod. ZAPM64102, Piaggio).

The vehicle including the body frame that can lean and the two front wheels includes a link mechanism. The link mechanism includes an upper cross portion and a lower cross portion. In addition, the link mechanism also includes a right side portion which supports right end portions of the upper cross portion and the lower cross, and a left side portion which supports left end portions of the upper cross portion and the lower cross portion. Middle portions of the upper cross portion and the lower cross portion are supported on the body frame forward of a steering shaft. The upper cross portion and the lower cross portion are supported on the body frame so as to turn about axes that extend substantially in a front-and-rear direction of the body frame. The upper cross portion and the lower cross portion turn relative to the body frame as the body frame leans. In response, a relative position of the two front wheels in an up-and-down direction of the body frame changes. The upper cross portion and the lower cross portion are arranged above the two front wheels in the up-and-down direction of the body frame such that the body frame rests in an upright state.

The vehicle including the body frame that can lean and the two front wheels includes a right shock absorbing device which supports the right front wheel so as to move in the up-and-down direction of the body frame and a left shock absorbing device which supports the left front wheel so as to move in the up-and-down direction of the body frame. The right shock absorbing device is supported on the right side portion so as to turn about an axis of the right side portion. The left shock absorbing device is supported on the left side portion so as to turn about an axis of the left side portion. The vehicles described in Japanese Patent Unexamined publication JPA-2005-313876 and U.S. Design Pat. D547,242S further include a handlebar, a steering shaft, and a turn transfer mechanism. The handlebar is fixed to the steering shaft. The steering shaft is supported on the body frame so as to turn relative thereto. When the handlebar is turned, the steering shaft is also turned. The turn transfer mechanism transfers the turning motion of the steering shaft to the right shock absorbing device and to the left shock absorbing device.

The vehicle including the body frame that can lean and the two front wheels includes many on-board components which are provided around the periphery of the steering shaft. The on-board components include lamps such as a headlamp, a radiator, a reservoir tank, electric components such as a horn, and a main switch of the vehicle, a stowage box, a stowage pocket and the like.

In the vehicles described in Japanese Patent Unexamined publication JP-A-2005-313876 and U.S. Design Pat. D547, 242S, loads received by the right front wheel and the left front wheel are transferred to the link mechanism by way of the right shock absorbing device or the left shock absorbing device. The loads are transferred to the right side portion or the left side portion from the right shock absorbing device or the left shock absorbing device. The loads are transferred to the upper cross portion and the lower cross portion from the right side portion or the left side portion. The loads are transferred further to the body frame which is positioned around the periphery of the steering shaft from the upper cross portion and the lower cross portion.

The link mechanism includes bearings provided between the right side portion or the left side portion and the upper cross portion and the lower cross portion and bearings provided between the upper cross portion and the lower cross portion and the body frame. These bearings function not only to enable the right side portion or the left side portion to turn smoothly relative to the upper cross portion and the lower cross portion, but also to transfer the loads received by the link mechanism to the body frame.

In addition, the right side portion, the left side portion, the upper cross portion, and the lower cross portion are highly rigid to enhance the function of turning smoothly and the function of transferring the loads. This enlarges the size of right side portion, the left side portion, the upper cross portion, and the lower cross portion. This results in enlargement of the link mechanism including those portions. Further, the movable range of the link mechanism is also enlarged even more.

The vehicles described in Japanese Patent Unexamined publication JP-A-2005-313876 and U.S. Design Pat. D547, 242S include the link mechanism provided around the periphery of the steering shaft, and this link mechanism moves as the body frame leans. Because of this, in the vehicle including the body frame that can lean and the two front wheels, the on-board components need to be arranged so that the on-board components do not interfere with the movable range of the link mechanism. In the vehicle that includes the body frame that can lean and the two front wheels, this tends to increase the construction around the periphery of the steering shaft.

SUMMARY OF THE INVENTION

Preferred embodiments of the present invention provide a vehicle including a body frame that can lean, and two front wheels, which prevents enlargement of a peripheral construction around a steering shaft that is above the two front wheels.

According to a preferred embodiment of the present invention, a vehicle driven by power from a power source includes a left front wheel and a right front wheel that are steerable and disposed in a left-and-right direction as seen from a front of the vehicle; a right shock absorbing device that supports the right front wheel at a lower portion thereof and configured to absorb an upward displacement of the right front wheel in an up-and-down direction of a body frame; a left shock absorbing device that supports the left front wheel at a lower portion thereof and configured to absorb an upward displacement of the left front wheel in the up-and-down direction of the body frame; a link mechanism including a right side portion that supports an upper portion of the right shock absorbing device so as to turn about a right steering axis that extends in the up-and-down direction of the body frame, a left side portion that supports an upper portion of the left shock absorbing device so as to turn about a left steering axis parallel or substantially parallel to the right steering axis, an upper cross portion that includes a right end portion that supports an upper portion of the right side portion via an upper right bearing so as to turn about an upper right axis that extends in a front-and-rear direction of the body frame, a left side portion that supports an upper portion of the left side portion via an upper left bearing so as to turn about an upper left axis parallel or substantially parallel to the upper right axis, and a middle portion supported on the body frame via an upper middle bearing so as to turn about an upper middle axis parallel or substantially parallel to the upper right axis and the upper left axis, and a lower cross portion that includes a right end portion that supports a lower portion of the right side portion via a lower right bearing so as to turn about a lower right axis parallel or substantially parallel to the upper right axis, a left end portion that supports a lower portion of the left side portion via a lower left bearing so as to turn about a lower left axis parallel or substantially parallel to the upper left axis, and a middle portion supported on the body frame via a lower middle bearing so as to turn about a lower middle axis parallel or substantially parallel to the upper middle axis; a steering shaft supported on the body frame between the right side portion and the left side portion in a transverse direction of the body frame, and including an upper end portion provided higher in the up-and-down direction of the body frame than the lower middle axis and configured to turn about a middle steering axis that extends in the up-and-down direction of the body frame; a handlebar provided at the upper end portion of the steering shaft; and a turn transfer mechanism configured to transfer a turning motion of the steering shaft corresponding to an operation of the handlebar to the right shock absorbing device and to the left shock absorbing device; wherein, in the link mechanism, the upper cross portion has a different volume from the lower cross portion, and a displacement of the upper cross portion resulting when a forward or rearward test force in a direction of the upper right axis is exerted on the upper right bearing with the lower cross portion removed and the upper cross portion mounted, a displacement of the upper cross portion resulting when a force the same in magnitude and direction as the test force is exerted on the upper left bearing with the lower cross portion removed and the upper cross portion mounted, a displacement of the lower cross portion resulting when a force the same in magnitude and direction as the test force is exerted on the lower right bearing with the upper cross portion removed and the lower cross portion mounted, and a displacement of the lower cross portion resulting when a force the same in magnitude and direction as the test force is exerted on the lower left bearing with the upper cross portion removed and the lower cross portion mounted are equal or substantially equal to one another.

The right side portion, the left side portion, the upper cross portion, and the lower cross portion of the link mechanism are highly rigid to enhance the function of turning smoothly and the function of transferring loads. This enlarges the right side portion, the left side portion, the upper cross portion, and the lower cross portion in size. This results in enlargement of the link mechanism including those portions. Further, the movable range of the link mechanism is also enlarged further. The vehicle that includes the body frame that can lean and the two front wheels includes, around the periphery of the steering shaft, a large link mechanism that moves as the body frame leans. Because of this, in the vehicle including the body frame that can lean and the two front wheels, the on-board components are arranged so that the on-board components do not interfere with the movable range of the link mechanism. In the vehicle that includes the body frame that can lean and the two front wheels, this tends to increase the construction around the periphery of the steering shaft.

The inventor of the preferred embodiments of the present invention has analyzed in detail the function of the link mechanism. The link mechanism includes the function of enabling the right side portion or the left side portion to turn smoothly relative to the upper cross portion and the lower cross portion and the function of enabling the upper cross portion and the lower cross portion to turn smoothly relative to the body frame. Additionally, the link mechanism includes the function of transferring loads received by the right side portion and the left side portion to the body frame. The inventor discovered the fact that the load received by the link mechanism includes loads in the direction of the rotational axes of the upper cross portion, the lower cross portion, the left side portion, and the right side portion and loads in directions that extend in the up-and-down direction of the body frame and that are vertical to the rotational axes. Further, the inventor discovered the fact that the smooth operation of the link mechanism is easily maintained by making the rigidity of the upper cross portion to the loads in the direction of the rotational axes equal or substantially equal to the rigidity of the lower cross portion to the loads in the direction of the rotational axes.

According to a preferred embodiment of the present invention, the movable range of the link mechanism changes from a simple shape like a rectangular parallelepiped to an irregular shape by making the volume of the upper cross portion differ from the volume of the lower cross portion. This enhances the degree of freedom in designing the periphery of the steering shaft. As a result of this, even though various on-board components that differ in size and the link mechanism are disposed around the periphery of the steering shaft, it is possible to prevent the enlargement of the periphery thereof. Moreover, the smooth operation of the link mechanism is easy to be maintained since the rigidity of the upper cross portion to the loads in the direction of the rotational axes is equal or substantially equal to the rigidity of the lower cross portion to the loads in the direction of the rotational axes.

Consequently, in the vehicle that includes the body frame that can lean and the two front wheels, it is possible to prevent the enlargement of the peripheral construction of the steering shaft that is located above the two front wheels while the function of the link mechanism is maintained.

The link mechanism is preferably configured such that the upper cross portion is made of a different material from the lower cross portion.

According to a preferred embodiment of the present invention that includes the body frame that can lean and the two front wheels, when the upper cross portion is made of a material more rigid than a material of which the lower cross portion is made, the volume of the upper cross portion is smaller than the volume of the lower cross portion while the rigidity of the upper cross portion to the loads in the direction of the rotational axes are kept identical to that of the lower cross portion. When the lower cross portion is made of a material more rigid than a material of which the upper cross portion is made, the lower cross portion preferably has a smaller shape than that of the upper cross portion while the rigidity of the upper cross portion to the loads in the direction of the rotational axes is kept identical to that of the lower cross portion. This enables the movable range of the link mechanism to be changed from the simple shape like a rectangular parallelepiped to the irregular shape. This enhances the degree of freedom in designing the periphery of the steering shaft. As a result of this, even though various on-board components that differ in size and the link mechanism are disposed around the periphery of the steering shaft, it is possible to prevent the enlargement of the periphery thereof.

The link mechanism is preferably configured such that the upper cross portion is made of a material identical to the material of the lower cross portion.

According to a preferred embodiment of the present invention that includes the body frame that can lean and the two front wheels, the movable range of the link mechanism changes from the simple shape like a rectangular parallelepiped to the irregular shape by making the volume of the upper cross portion differ from the volume of the lower cross portion although the upper cross portion and the lower cross portion are made of the same material. This enhances the degree of freedom in designing the periphery of the steering shaft. As a result of this, even though various on-board components that differ in size and the link mechanism are disposed around the periphery of the steering shaft, it is possible to prevent the enlargement of the periphery thereof.

The body frame preferably includes a link supporting portion that supports the upper cross portion and the lower cross portion in a turnable manner, and the link mechanism is preferably configured such that a volume of a front portion of the upper cross portion that is located farther forward than the link supporting portion in the direction of the upper right axis differs from a volume of a rear portion of the upper cross portion that is located farther rearward than the link supporting portion.

According to a preferred embodiment of the present invention that includes the body that can lean and the two front wheels, the volume of the front portion of the upper cross portion that is located farther forward than the link supporting portion is different from the volume of the rear portion of the upper cross portion that is located farther rearward than the link supporting portion, and therefore, the movable range of the link mechanism is able to change from the simple shape like a rectangular parallelepiped to the irregular shape. This enhances the degree of freedom in designing the space around the periphery of the rear portion of the upper cross portion. As a result of this, even though various on-board components that differ in size and the link mechanism are disposed around the periphery of the steering shaft, it is possible to prevent the enlargement of the periphery thereof.

The body frame preferably includes a link supporting portion that supports the upper cross portion and the lower cross portion in a turnable manner, and the link mechanism is preferably configured such that a volume of a front portion of the lower cross portion that is located farther forward than the link supporting portion in the direction of the upper right axis differs from a volume of a rear portion of the lower cross portion that is located farther rearward than the link supporting portion.

According to a preferred embodiment of the present invention that includes the body frame that can lean and the two front wheels, the volume of the front portion of the lower cross portion that is located farther forward than the link supporting portion is different from the volume of the rear portion of the lower cross portion that is located farther rearward than the link supporting portion, and therefore, the movable range of the link mechanism is able to change from the simple shape like a rectangular parallelepiped to the irregular shape. This enhances the degree of freedom in designing the space around the periphery of the rear portion of the upper cross portion. As a result of this, even though various on-board components that differ in size and the link mechanism are disposed around the periphery of the steering shaft, it is possible to prevent the enlargement of the periphery thereof.

The link mechanism is preferably configured such that the upper cross portion has a smaller volume than the lower cross portion.

According to a preferred embodiment of the present invention that includes the body frame that can leans and the two front wheels, the upper cross portion has a smaller volume than the lower cross portion, and therefore, the movable range of the link mechanism is able to change from the simple shape like a rectangular parallelepiped to the irregular shape in which the upper portion is smaller than the lower portion. This enhances the degree of freedom in designing the space at the front portion of the vehicle around the periphery of the upper cross portion. As a result of this, even though various on-board components that differ in size and the link mechanism are disposed around the periphery of the steering shaft, it is possible to prevent the enlargement of the periphery thereof.

The body frame preferably includes a link supporting portion that supports the upper cross portion and the lower cross portion in a turnable manner, and the link mechanism is preferably configured such that a front portion of the upper cross portion that is located farther forward than the link supporting portion in the direction of the upper right axis has a smaller volume than a front portion of the lower cross portion that is located farther forward than the link supporting portion.

According to a preferred embodiment of the present invention that includes the body frame that can lean and the two front wheels, the volume of the front portion of the upper cross portion that is located farther forward than the link supporting portion is smaller than the volume of the front portion of the lower cross portion that is located farther forward than the link supporting portion, and therefore, the movable range of the link mechanism is able to change from the simple shape like a rectangular parallelepiped to the irregular shape in which the front upper portion is smaller than the front lower portion. This enhances the degree of freedom in designing the front peripheral space of the upper cross portion. As a result of this, even though various on-board components that differ in size and the link mechanism are disposed around the periphery of the steering shaft, it is possible to prevent the enlargement of the periphery thereof.

The body frame preferably includes a link supporting portion that supports the upper cross portion and the lower cross portion in a turnable manner, and the upper cross portion or the lower cross portion is preferably located either forward of or rearward of the link supporting portion, and does not have to be located both forward of and rearward of the link supporting portion.

According to a preferred embodiment of the present invention that includes the body frame that can lean and the two front wheels, the upper cross portion or the lower cross portion is provided only either forward of or rearward of the link supporting portion, and therefore, the movable range of the link mechanism is able to change from the simple shape like a rectangular parallelepiped to the irregular shape in which the upper portion is smaller than the lower portion. This enhances the degree of freedom in designing the periphery of the steering shaft. As a result of this, even though various on-board components that differ in size and the link mechanism are disposed around the periphery of the steering shaft, it is possible to prevent the enlargement of the periphery thereof.

The link mechanism is preferably configured such that a front end of the upper cross portion is located at a different position from a position where a front end of the lower cross portion is located in the direction of the upper right axis.

According to a preferred embodiment of the present invention that includes the body frame that can lean and the two front wheels, the movable range of the link mechanism is able to change from the simple shape like a rectangular parallelepiped to the irregular shape in the front-and-rear direction since the front end of the upper cross portion is located at a different position from the position where the front end of the lower cross portion is located in the direction of the upper right axis. This enhances the degree of freedom in designing the periphery of the steering shaft. As a result of this, even though various on-board components that differ in size and the link mechanism are disposed around the periphery of the steering shaft, it is possible to prevent the enlargement of the periphery thereof.

The link mechanism is preferably configured such that a rear end of the upper cross portion is located at a different position from a position where a rear end of the lower cross portion is located in the direction of the upper right axis.

According to a preferred embodiment of the present invention that includes the body frame that can lean and the two front wheels, the movable range of the link mechanism is able to change from the simple shape like a rectangular parallelepiped to the irregular shape in the front-and-rear direction since the rear end of the upper cross portion is located at a different position from the position where the rear end of the lower cross portion is located in the direction of the upper right axis. This enhances the degree of freedom in designing the periphery of the steering shaft. As a result of this, even though various on-board components that differ in size and the link mechanism are disposed around the periphery of the steering shaft, it is possible to prevent the enlargement of the periphery thereof.

The body frame preferably includes a link supporting portion that supports the upper cross portion and the lower cross portion in a turnable manner, and the link supporting portion preferably supports the steering shaft in a turnable manner.

According to a preferred embodiment of the present invention that includes the body frame that can leans and the two front wheels, the link supporting portion supports the link mechanism that supports a right front wheel, a left front wheel, a right shock absorbing device, and a left shock absorbing device and is highly rigid. Because of this, the configuration that supports the steering shaft is simplified by making use of the high rigidity. As a result, it is possible to prevent the enlargement of the peripheral construction of the steering shaft.

The body frame preferably includes a link supporting portion that supports the upper cross portion and the lower cross portion in a turnable manner. The upper cross portion preferably includes an upper front portion located farther forward than the link supporting portion in the direction of the upper right axis and that is supported at the right end portion, the left end portion, and the middle portion and an upper rear portion positioned farther rearward than the link supporting portion in the direction of the upper right axis and that is supported at the right end portion, the left end portion, and the middle portion.

According to a preferred embodiment of the present invention that includes the body frame that can lean and the two front wheels, the upper cross portion includes the upper front portion positioned farther forward than the link supporting portion and the upper rear portion positioned farther rearward than the link supporting portion, and therefore, the balance between the rigidity and the volume of the upper cross portion is easily controlled. This enhances the degree of freedom in designing the periphery of a lower portion of the steering shaft. This also enhances the degree of freedom in designing the space around the periphery of the lower cross portion. As a result of this, even though various on-board components that differ in size and the link mechanism are disposed around the periphery of the steering shaft, it is possible to prevent the enlargement of the periphery thereof.

Compared with a case where only the upper front portion is disposed at the front of the headpipe and no portion is disposed at the rear of the headpipe or a case where only the upper rear portion is disposed at the rear of the headpipe and no portion is disposed at the front of the headpipe, since the upper front portion and the upper rear portion are disposed at the front and rear of the headpipe, respectively, it is easy to enhance the rigidity of the upper cross portion without enlarging the dimension in the front-and-rear direction of the body frame. This prevents the volume of the upper cross portion from being increased while enhancing the rigidity of the upper cross portion. This enhances the degree of freedom in designing the space around the periphery of the upper portion of the link mechanism. As a result of this, even though various on-board components that differ in size and the link mechanism are disposed around the periphery of the steering shaft, it is possible to prevent the enlargement of the periphery thereof.

The body frame preferably includes a link supporting portion that supports the upper cross portion and the lower cross portion in a turnable manner. The lower cross portion preferably includes a lower front portion positioned farther forward than the link supporting portion in the direction of the lower right axis and is supported at the right end portion, the left end portion, and the middle portion and a lower rear portion positioned farther rearward than the link supporting portion in the direction of the lower right axis that is supported at the right end portion, the left end portion, and the middle portion.

According to a preferred embodiment of the present invention that includes the body frame that can lean and the two front wheels, the lower cross portion includes the lower front portion positioned farther forward than the link supporting portion and the lower rear portion positioned farther rearward than the link supporting portion, and therefore, the balance between the rigidity and the volume of the lower cross portion is easily controlled. This enhances the degree of freedom in designing the periphery of a lower portion of the steering shaft. This also enhances the degree of freedom in designing the space around the periphery of the rear portion of the lower cross portion. As a result of this, even though various on-board components that differ in size and the link mechanism are disposed around the periphery of the steering shaft, it is possible to prevent the enlargement of the periphery thereof.

Compared with a case where only the lower front portion is disposed at the front of the headpipe and no portion is disposed at the rear of the headpipe or a case where only the lower rear portion is disposed at the rear of the headpipe and no portion is disposed at the front of the headpipe, since the lower front portion and the lower rear portion are disposed at the front and rear of the headpipe, respectively, it is easy to enhance the rigidity of the lower cross portion without enlarging the dimension of the portion in the front-and-rear direction of the body frame. This prevents the volume of the lower cross portion from being increased while enhancing the rigidity of the lower cross portion. This enhances the degree of freedom in designing the space around the periphery of the lower portion of the link mechanism. As a result of this, even though various on-board components that differ in size and the link mechanism are disposed around the periphery of the steering shaft, it is possible to prevent the enlargement of the periphery thereof.

According to the various preferred embodiments of the present invention of a vehicle that includes the body frame that can lean and the two front wheels, it is possible to prevent the enlargement of the peripheral construction of the steering shaft that is located above the two front wheels while the function of the link mechanism is maintained.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
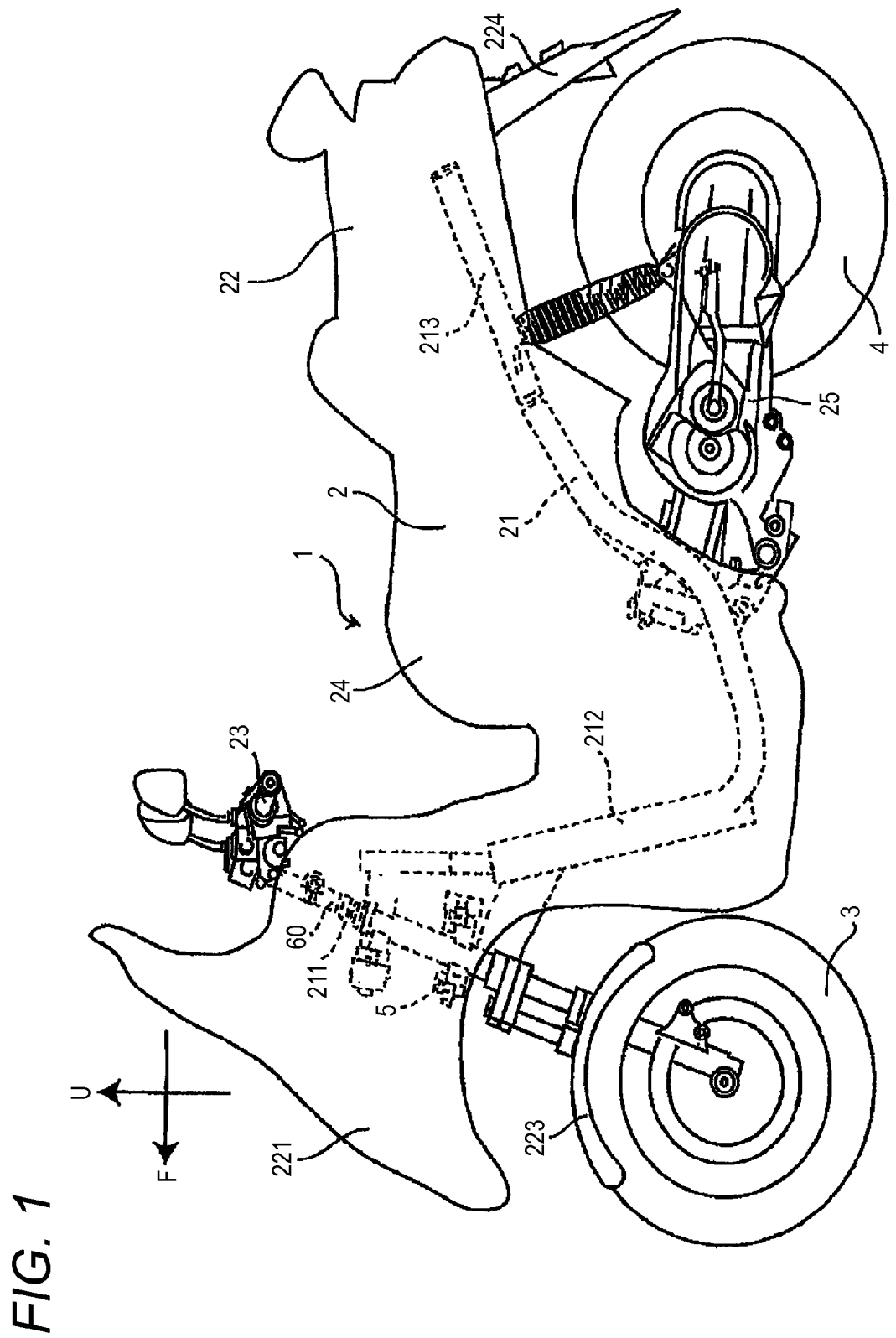
FIG. 1 is a left side view of a vehicle according to a preferred embodiment of the present invention.

Hereinafter, a vehicle 1 which is one type of a vehicle according to a preferred embodiment of the present invention will be described with reference to the drawings. In the figures, like reference numerals are given to like or corresponding portions and the description thereof will not be made repeatedly.

In the following description, an arrow F in the drawings denotes a forward direction of the vehicle 1. An arrow R in the drawings denotes a rightward direction of the vehicle 1. An arrow U denotes an upward direction. A middle position in a vehicle-width direction indicates a central position in the direction of a width of the vehicle or in a vehicle-width direction of the vehicle as seen from the front. A side of the vehicle in the vehicle-width direction indicates a leftward or rightward direction from the middle position in the vehicle-width direction.

FIG. 1 is an overall side view of the vehicle 1. In the following description, when front, rear, left, and right are referred to with a view to showing directions, they denote front, rear, left, and right as seen from a rider who rides on the vehicle 1.

The vehicle 1 includes a vehicle main body 2, front wheels 3, and a rear wheel 4. The vehicle main body 2 includes a body frame 21, a body cover 22, a handlebar 23, a seat 24, and a power unit 25.

The body frame 21 supports the power unit 25, the seat 24 and the like. The power unit 25 includes a power source such as an engine or an electric motor, a transmission and the like. In FIG. 1, the body frame 21 is shown by broken lines.

The body frame 21 includes a headpipe 211, a front frame 212, and a rear frame 213. The headpipe 211 is disposed at a front portion of the vehicle. A link mechanism 5 is disposed around the periphery of the headpipe 211.

A steering shaft 60 is inserted into the headpipe 211 so as to turn therein. The steering shaft 60 extends in an up-and-down direction. The handlebar 23 is attached to an upper end of the steering shaft 60. The front frame 212 is inclined downward from a front end thereof to the rear. The front frame 212 is connected to the headpipe 211 at a position that located farther rearward than an upper cross portion 51, which will be described below. The rear frame 213 supports the seat 24 and a tail lamp.

The body frame 21 is covered by the body cover 22. The body cover 22 includes a front cover 221, front fenders 223, and a rear fender 224.

The front cover 221 is positioned forward of the seat 24. The front cover 221 covers the headpipe 211 and the link mechanism 5.

The front fenders 223 are provided individually above a pair of left and right front wheels 3. The front fenders 223 are disposed below the front cover 221. The rear fender 224 is disposed above the rear wheel 4.

The front wheels 3 are disposed below the headpipe 211 and the link mechanism 5. The front wheels 3 are disposed below the front cover 221.

Figure 2:
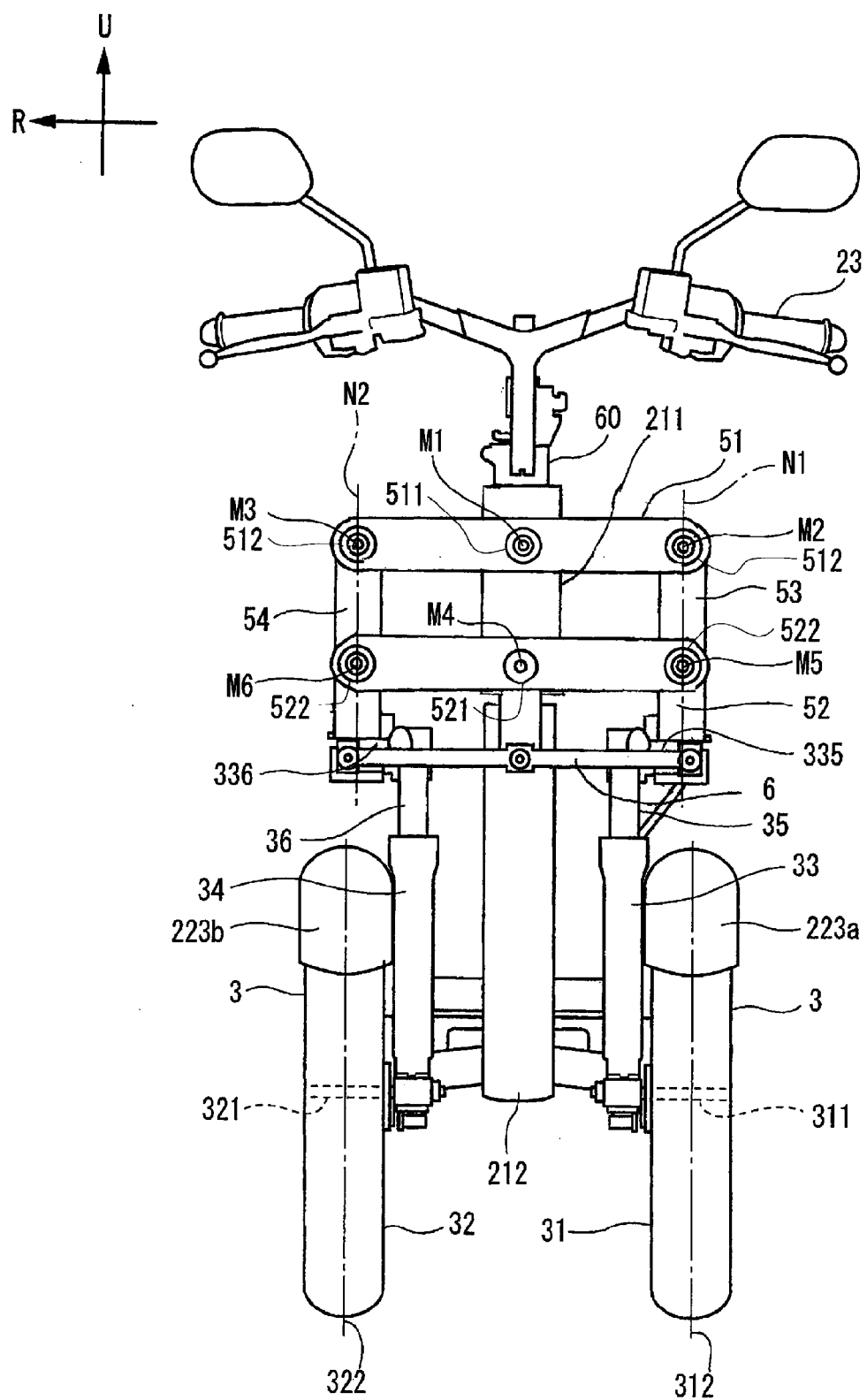
FIG. 2 is an overall front view of the vehicle with a body cover removed.

FIG. 2 is an overall front view of the vehicle 1 with the body cover 22 removed. In FIG. 2, the front frame 212 and the like are omitted from the illustration.

The vehicle 1 includes the handlebar 23, the steering shaft 60, the headpipe 211, the pair of left and front wheels 3, and the link mechanism 5. The link mechanism 5 is disposed around the periphery of the headpipe 211. The link mechanism 5 is connected to the pair of left and front wheels 3, that is, a left front wheel 31 and a right front wheel 32. Additionally, the link mechanism 5 is mounted on the headpipe 211 so as to turn thereon. The link mechanism 5 includes the upper cross portion 51, a lower cross portion 52, a left side portion 53, a right side portion 54, a first bracket 335, a second bracket 336, a left shock absorber 33, a right shock absorber 34, and a tie-rod 6.

The front wheels 3 are aligned side by side in a left-and-right direction of the body frame 21 and include the left front wheel 31 and the right front wheel 32 that are steered. A left front fender 223a is disposed above the left front wheel 31. A right front fender 223b is disposed above the right front wheel 32. The right front wheel 32 is disposed symmetrically with the left front wheel 31 with respect to the headpipe 211 in relation to the left-and-right direction of the body frame 21.

Figure 5:
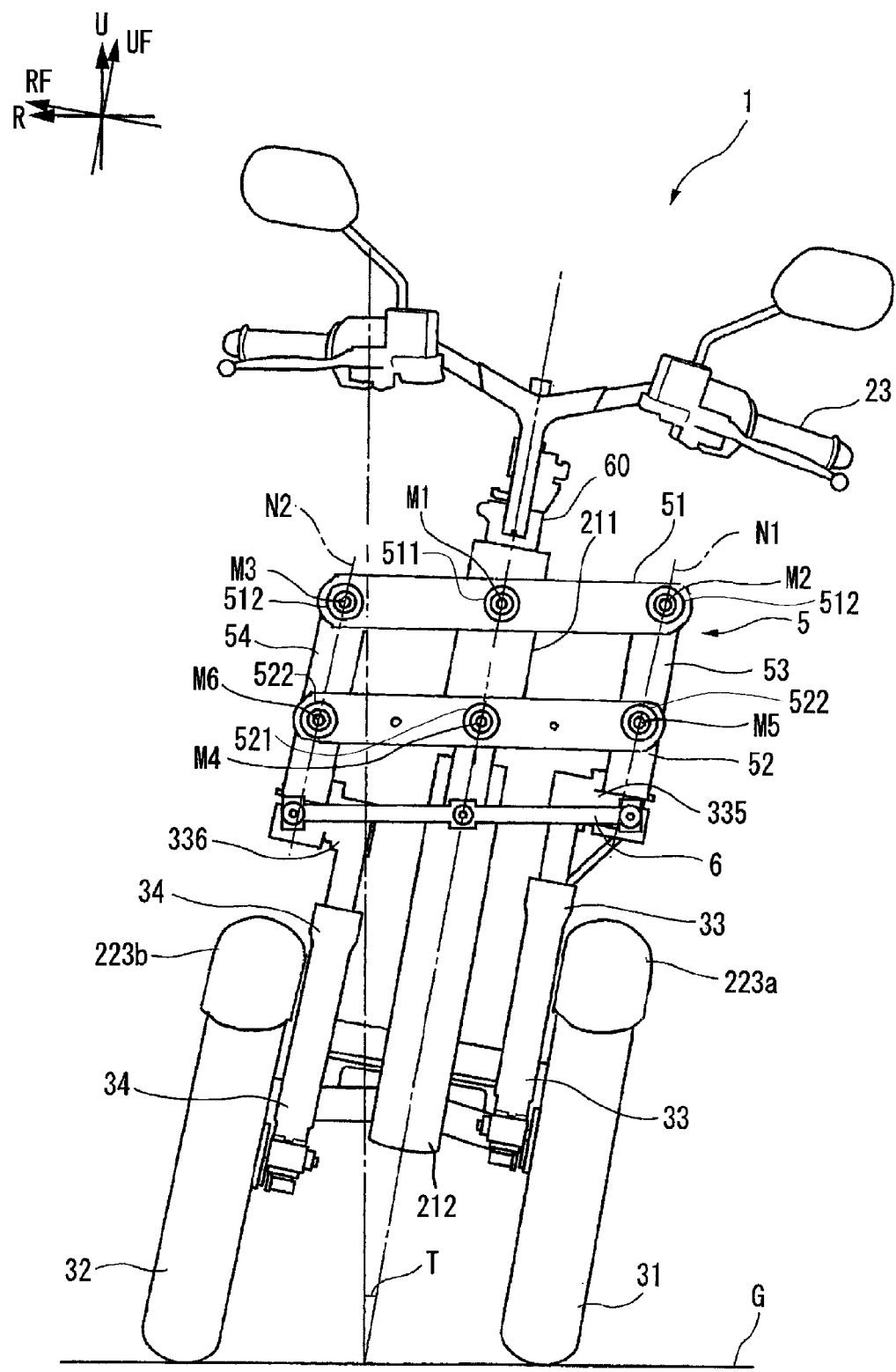
FIG. 5 is an overall front view showing a state in which the vehicle is caused to lean.

When referred to in this description, a "rightward direction RF of the body frame 21" denotes a rightward direction that intersects an axial direction of the headpipe 211 perpendicularly when the vehicle 1 is seen from the front. Additionally, an upward direction UF of the body frame 21 denotes an upward direction of the body frame 21 when the vehicle 1 rests upright. For example, the upward direction of the body frame 21 coincides with the axial direction of the headpipe 211 when the vehicle 1 is seen from the front. As shown in FIG. 2, with the vehicle 1 is resting in an upright state, the rightward direction RF of the body frame 21 coincides with a rightward direction R in a horizontal direction. Because of this, in FIG. 2, only the rightward direction R is shown in relation to the horizontal direction. As shown in FIG. 5, with the vehicle 1 resting to lean in relation to a road surface G, the rightward direction RF of the body frame 21 does not coincide with the rightward direction R in the horizontal direction, and the upward direction UF of the body frame 21 does not coincide with the upward direction in a perpendicular direction.

The left front wheel 31 is connected to the left shock absorber 33. The left front wheel 31 is connected to a lower portion of the left shock absorber 33. The left front wheel 31 rotates about a rotational shaft 311. The rotational shaft 311 extends in the left-and-right direction of the body frame 21. The left front wheel 31 turns about a turning axis 312. The vehicle 1 changes its traveling direction as a result of the left front wheel 31 turning about the turning axis 312.

The right front wheel 32 is connected to the right shock absorber 34. The right front wheel 32 is connected to a lower portion of the right shock absorber 34. The right front wheel 32 rotates about a rotational shaft 321. The rotational shaft 321 extends in the left-and-right direction of the body frame 21. The right front wheel 32 turns about a turning axis 322. The vehicle 1 changes its traveling direction as a result of the right front wheel 32 turning about the turning axis 322.

The left shock absorber 33 absorbs impacts exerted on the left front wheel 31. The left shock absorber 33 is disposed below the link mechanism 5 in relation to the up-and-down direction of the body frame 21. The left shock absorber 33 is provided between the left side portion 53 (refer to FIG. 3), which will be described below, and the left front wheel 31. The left shock absorber 33 extends along a left steering axis N1 that extends in a direction in which the steering shaft 60 and the headpipe 211 extend. The left shock absorber 33 is disposed to the left of the headpipe 211 in relation to the left-and-right direction of the body frame 21. The left shock absorber 33 is disposed to the right of the left front wheel 31 in relation to the left-and-right direction of the body frame 21.

The right shock absorber 34 absorbs impacts exerted on the right front wheel 32. The right shock absorber 34 is disposed below the link mechanism 5 in relation to the up-and-down direction of the body frame 21. The right shock absorber 34 is provided between the right side portion 54 (refer to FIG. 3), which will be described below, and the right front wheel 32. The right shock absorber 34 extends along a right steering axis N2 that extends in a direction in which the steering shaft 60 and the headpipe 211 extend. The right shock absorber 34 is disposed to the right of the body frame 21. The right shock absorber 34 is disposed to the left of the right front wheel 32 in relation to the left-and-right direction of the body frame 21.

The tie-rod 6 transfers the steering motion of the handlebar 23 to the left front wheel 31 and the right front wheel 32. By doing so, the left front wheel 31 and the right front wheel 32 are steered by the handlebar 23. The tie-rod 6 is located forward of the headpipe 211. The tie-rod 6 extends in the left-and-right direction of the body frame 21. The tie-rod 6 is disposed below the lower cross portion 52, which will be described below, and above the left front wheel 31 and the right front wheel 32 in relation to the up-and-down direction of the body frame 21. The tie-rod 6 is coupled to a lower end portion of the steering shaft 60. When the steering shaft 60 is turned, the tie-rod 6 moves in the left-and-right direction of the body frame 21.

Figure 3:
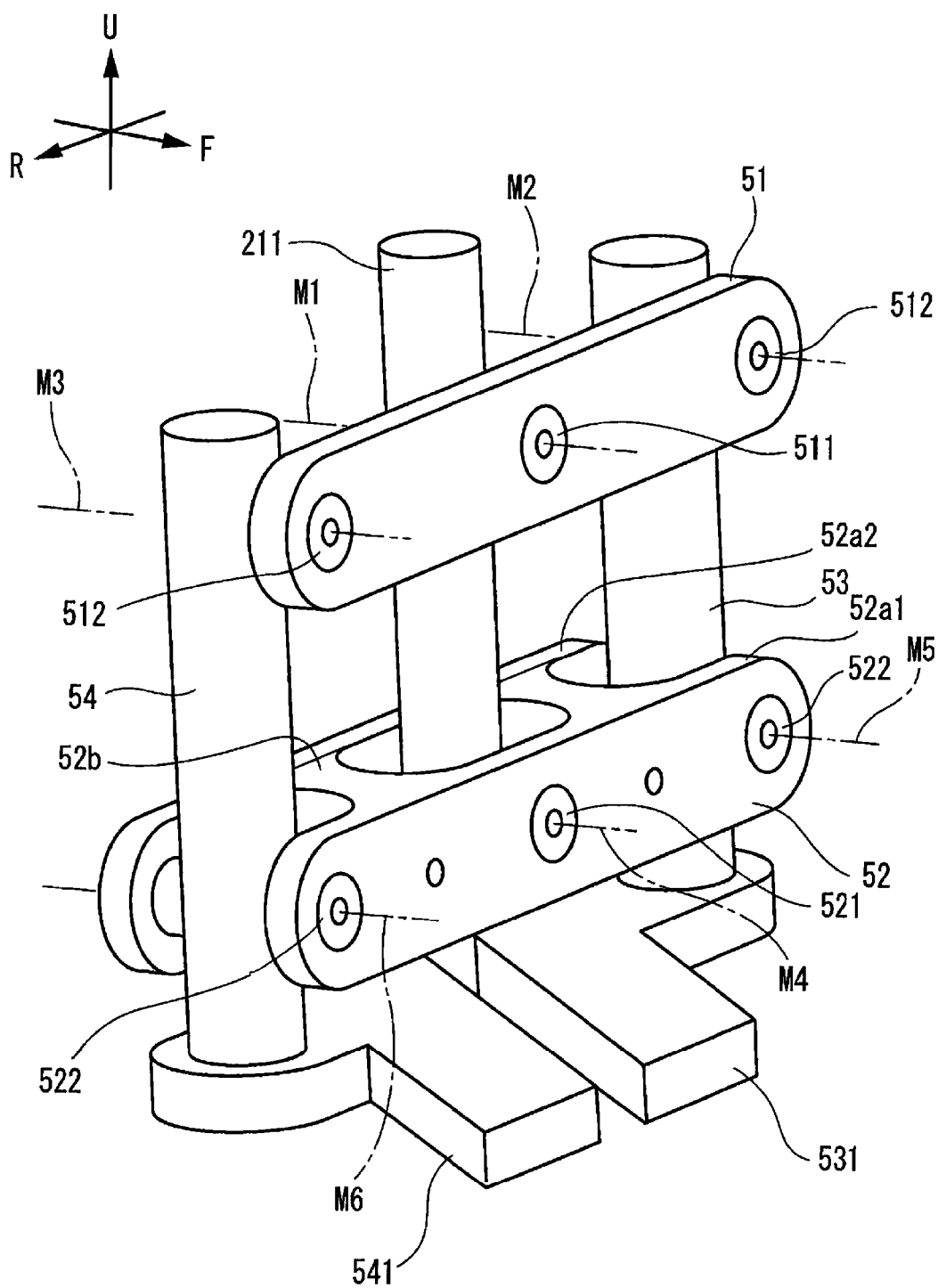
FIG. 3 is a perspective view of a link mechanism.

FIG. 3 is a perspective view of the link mechanism 5 with the left shock absorber 33 and the right shock absorber 34 omitted from the illustration.

The left side portion 53 is disposed to the left of the headpipe 211 in relation to the left-and-right direction of the body frame 21. The right side portion 54 is disposed to the right of the headpipe 211 in relation to the left-and-right direction of the body frame 21. The left side portion 53 and the right side portion 54 are preferably cylindrical or substantially cylindrical members.

The left side portion 53 and the right side portion 54 extend in the up-and-down direction of the body frame 21 with the vehicle resting in the upright state. A mounting piece 531 where the left shock absorber 33 is mounted is provided at a lower end of the left side portion 53. A lower portion of the left side portion 53 supports the left shock absorber 33 so as to turn about the left steering axis N1.

A mounting piece 541 where the right shock absorber 34 is mounted is provided at a lower end of the right side portion 54. A lower portion of the right side portion 54 supports the right shock absorber 34 to turn about the right steering axis N2.

In the present preferred embodiment, the upper cross portion 51 is a single plate-shaped portion that extends in the left-and-right direction when seen from the front of the vehicle. The upper cross portion 51 is provided farther forward to the front of the vehicle than the headpipe 211. The upper cross portion 51 includes an upper middle bearing 511 located at a middle portion of the upper cross portion 51 in relation to the left-and-right direction of the body frame 21 and an upper right bearing 512 and an upper left bearing 512 provided at rightward and leftward portions of the upper cross portion 51 in the left-and-right direction of the body frame 21. An upper middle axis M1 that defines a rotational center of the upper middle bearing 511, an upper left axis M2 that defines a rotational center of the upper left bearing 512, and an upper right axis M3 that defines a rotational center of the upper right bearing 512 are provided so that corresponding rotational shafts are parallel or substantially parallel to one another.

The upper cross portion 51 is mounted on the headpipe 211 via the upper middle bearing 511. This allows the upper cross portion 51 to be supported on the headpipe 211 so as to turn about the upper middle axis M1 relative to the headpipe 211.

The upper cross portion 51 is connected to an upper portion of the left side portion 53 and an upper portion of the right side portion 54 via the upper left bearing 512 and the upper right bearing 512, respectively. This allows the upper cross portion 51 to turn about the upper left axis M2 and the upper right axis M3 relative to the left side portion 53 and the right side portion 54, respectively.

In the present preferred embodiment, the upper cross portion 51 is a single portion that supports the upper portion of the right side portion 54 at a right end portion thereof so as to turn about the upper right axis M3 that extends in a front-and-rear direction of the body frame 21 via the upper right bearing 512, supports the upper portion of the left side portion 53 at a left end portion thereof so as to turn about the upper left axis M2 parallel or substantially parallel to the upper right axis M3 via the upper left bearing 512, and is supported on the body frame 21 at the middle portion thereof so as to turn about the upper middle axis M1 parallel or substantially parallel to the upper right axis M3 and the upper left axis M2 via the upper middle bearing 511.

The lower cross portion 52 has a volume that differs from that of the upper cross portion 51. The lower cross portion 52 extends in the left-and-right direction of the body frame 21 when seen from the front of the vehicle. A length in the left-and-right direction of the lower cross portion 52 is equal or substantially equal to a length in the left-and-right direction of the upper cross portion 51. The lower cross portion 52 is located below the upper cross portion 51 in relation to the up-and-down direction of the body frame 21. The lower cross portion 52 preferably has a rigidity equal or substantially equal to that of the upper cross portion 51. The rigidities of the cross portions will be described in detail below.

The lower cross portion 52 includes a front lower cross portion 52a1 and a rear lower cross portion 52a2 that hold the headpipe 211 therebetween in the front-and-rear direction of the body frame 21 and a connecting portion 52b where the front lower cross portion 52a1 and the rear lower cross portion 52a2 are connected together with bolts, for example. The connecting portion 52b is preferably integral and unitary with the front lower cross portion 52a1. The connecting portion 52b is located at a position where the connecting portion 52b does not interfere with the headpipe 211, the left side portion 53, and the right side portion 54 even when the link mechanism 5 is actuated to operate as will be described below. In the present preferred embodiment, the front lower cross portion 52a1 and the rear lower cross portion 52a2 preferably have a thickness in the front-and-rear direction of the body frame 21 that is less than half a thickness of the upper cross portion 51 in the front-and-rear direction of the body frame 21. Additionally, the upper cross portion 51, the front lower cross portion 52a1, and the rear lower cross portion 52a2 are preferably made of the same material, for example, steel having the same modulus of elasticity.

In the front lower cross portion 52a1 and the rear lower cross portion 52a2 of the lower cross portion 52, a lower middle bearing 521 is provided at a middle portion in the left-and-right direction of the body frame 21 and a lower left bearing 522 and a lower right bearing 522 are provided at leftward and rightward portions in the left-and-right direction of the body frame 21. A lower middle axis M4 that defines a rotational center of the lower middle bearing 521 and a lower left axis M5 and a lower right axis M6 that define rotational centers of the lower left bearing 522 and the lower right bearing 522, respectively, are provided so that corresponding rotational shafts are parallel or substantially parallel to one another. Additionally, the lower middle axis M4, the lower left axis M5, and the lower right axis M6 are also provided so as to be parallel or substantially parallel to the upper middle axis M1, the upper left axis M2, and the upper right axis M3. In addition, the positions of the lower left bearing 522 and the lower right bearing 522 in the left-and-right direction of the body frame 21 are preferably the same as the positions of the upper left bearing 512 and the upper right bearing 512 in the left-and-right direction of the body frame 21 when the vehicle 1 is resting in the upright state.

The lower cross portion 52 is mounted on the headpipe 211 via the lower middle bearing 521 in a position located below the upper cross portion 51 in relation to the up-and-down direction of the body frame 21. This allows the lower cross portion 52 to be supported on the headpipe 211 so as to turn about the lower middle axis M4 that defines the rotational center of the lower middle bearing 521 relative to the headpipe 211.

The lower cross portion 52 is connected to a lower portion of the left side portion 53 and a lower portion of the right side portion 54 via the lower left bearing 522 and the lower right bearing 522, respectively. This allows the lower cross portion 52 to turn about the lower left axis M5 and the lower right axis M6 relative to the left side portion 53 and the right side portion 54, respectively.

In the present preferred embodiment, the lower cross portion 52 preferably includes a combination of two portions. In particular, the lower cross portion 52 includes a right end portion 52a2 that supports the lower portion of the right side portion 54 via the lower right bearing 522 so as to turn about the lower light axis M6 parallel or substantially parallel to the upper right axis M3, a left end portion that supports the lower portion of the left side portion 53 via the lower left bearing 522 so as to turn about the lower left axis M5 parallel or substantially parallel to the upper left axis M2, and a middle portion supported on the body frame 21 via the lower middle bearings 521 so as to turn about the lower middle axis parallel or substantially parallel to the upper middle axis and positioned farther rearwards than the headpipe 211. The portions denoted by reference numeral 52a1 and reference numeral 52b are positioned forward of the portion described above, and include a right end portion supporting the lower portion of the right side portion 54 via the lower right bearing 522 so as to turn about the lower right axis M6 parallel or substantially parallel to the upper right axis M3, a left end portion supporting the lower portion of the left side portion 53 via the lower left bearing 522 so as to turn about the left side axis M5 parallel or substantially parallel to the upper left axis M2, and a middle portion supported on the body frame 21 via the lower middle bearing 521 so as to turn about the lower middle axis parallel or substantially parallel to the upper middle axis.

In this manner, the upper cross portion 51 is supported on the headpipe 211 so as to turn about the upper middle axis M1 positioned above the left front wheel 31 and the right front wheel 32 in relation to the up-and-down direction of the body frame 21. The lower cross portion 52 is supported on the headpipe 211 so as to turn about the lower middle axis M4 positioned above the left front wheel 31 and the right front wheel 32 and positioned below the upper middle axis M1 in relation to the up-and-down direction of the body frame 21. The upper cross portion 51 and the lower cross portion 52 are both positioned above the left front wheel 31 and the right front wheel 32 in relation to the up-and-down direction of the body frame 21.

Thus, by being configured in the manner described above, the link mechanism 5 is operated within a plane that contains the left side portion 53 and the right side portion 54. It is noted that the link mechanism 5 is mounted on the headpipe 211. Because of this, even though the steering shaft 60 is turned in association with the steering of the handlebar 23, the link mechanism 5 is not turned relative to the body frame 21.

Figure 4:
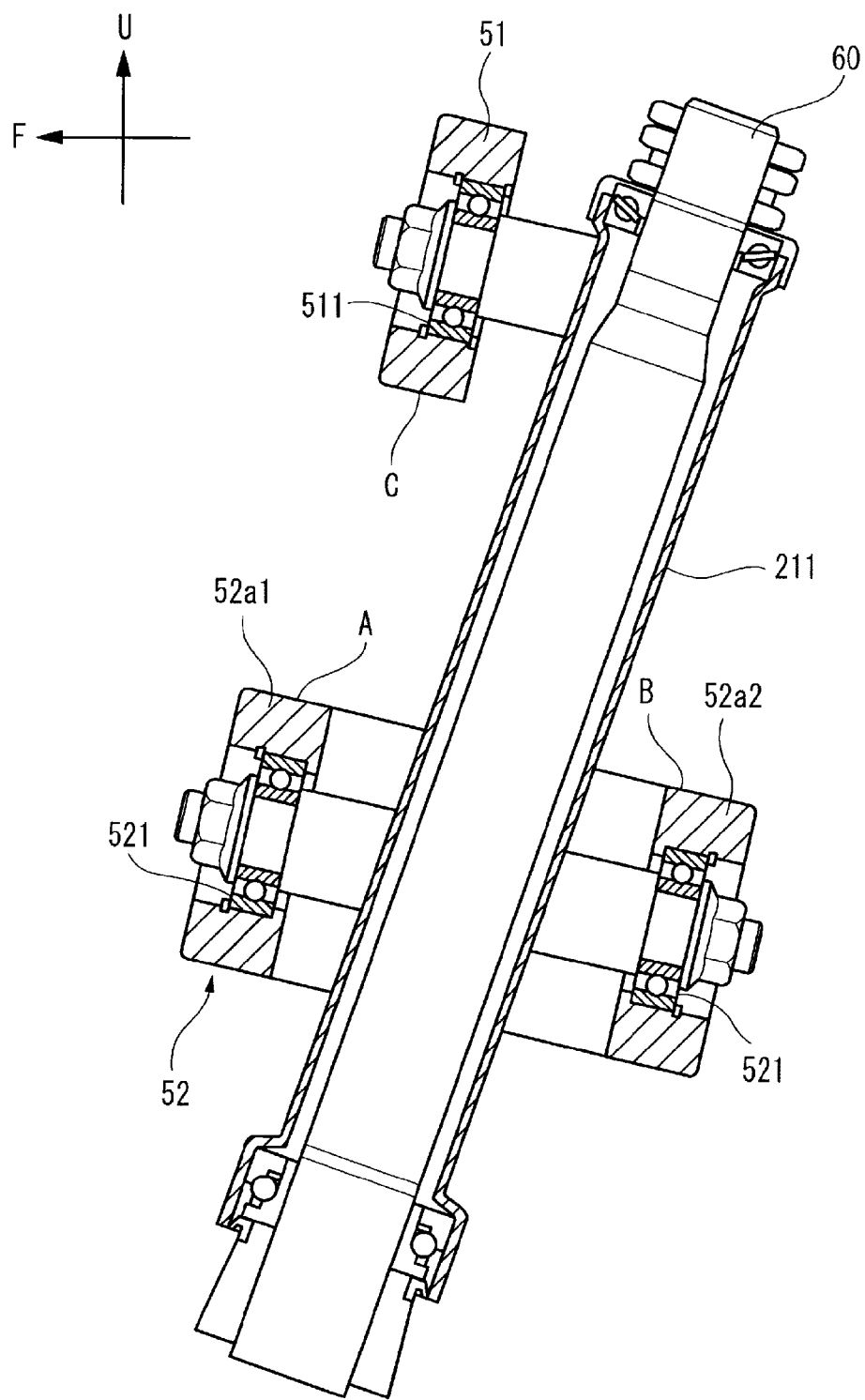
FIG. 4 is a side sectional view of the link mechanism.

FIG. 4 is a drawing showing an upper portion of the link mechanism 5 as seen from a side of the vehicle with the vehicle resting in the upright state. As shown therein, in the present preferred embodiment, a lower surface C of the upper cross portion 51 is located between an upper surface A of the front lower cross portion 52a1 that defines a front portion and an upper surface B of the rear lower cross portion 52a2 that defines a rear portion of the lower cross portion 52 in relation to the front-and-rear direction of the body frame 21.

Although the link mechanism 5 with the vehicle resting in the upright state is shown in FIG. 4, the positional relationship described above will be maintained even when the link mechanism 5 is actuated as the vehicle body leans, as will be described below. In particular, even when the link mechanism 5 is actuated, the lower surface C of the upper cross portion 51 is located between the upper surface A of the front lower cross portion 52a1 that defines the front portion of the lower cross portion 52 and the upper surface B of the rear lower cross portion 52a2 that defines the rear portion of the lower cross portion 52 in relation to the front-and-rear direction of the body frame 21.

In other words, the link mechanism 5 is provided so that a front end of the upper cross portion 51 and a front end of the lower cross portion 52 are located in different positions in the direction of the upper right axis M3.

As shown in FIG. 2, the first bracket 335 is provided at a lower portion of the left side portion 53. The first bracket 335 is connected to the left shock absorber 33. The first bracket 335 is mounted so as to turn relative to the left side portion 53. The tie-rod 6 is mounted on the first bracket 335 so as to turn relative thereto. A turning axis on which the first bracket 335 and the left side portion 53 turn relative to each other and a turning axis on which the first bracket 335 and the tie-rod 6 turn relative to each other are parallel or substantially parallel to a direction in which the left side portion 53 extends (a left steering axis N1).

The second bracket 336 is provided at a lower portion of the right side portion 54. The second bracket 336 is connected to the right shock absorber 34. The second bracket 336 is mounted so as to turn relative to the right side portion 54. The tie-rod 6 is mounted on the second bracket 336 so as to turn relative thereto. A turning axis on which the second bracket 336 and the right side portion 54 turn relative to each other and a turning axis on which the second bracket 336 and the tie-rod 6 turn relative to each other are parallel or substantially parallel to a direction in which the right side portion 54 extends (a right steering axis N2).

The steering shaft 60 is supported on the body frame 21 between the left member 53 and the right side portion 54 in the left-and-right direction of the body frame 21. An upper end portion of the steering shaft 60 is higher in the up-and-down direction of the body frame 21 than the lower middle axis M4. The steering shaft 60 turns about a middle steering axis Z that extends in the up-and-down direction of the body frame 21. The handlebar 23 is provided at the upper end portion of the steering shaft 60. The tie-rod 6 (an example of a turn transfer mechanism) transfers a turning motion of the steering shaft 60 corresponding to an operation of the handlebar 23 to the right shock absorber 34 and the left shock absorber 33.

When the steering shaft 60 turns as a result of the handlebar 23 being steered, the tie-rod 6 moves in the left-and-right direction of the body frame 21. Then, the first bracket 335 turns about the turning axis that connects the first bracket 335 to the left side portion 53 as the tie-rod 6 moves. This moves a connecting portion 52b where the first bracket 335 connects to the left shock absorber 33 in the left-and-right direction of the body frame 21, and the left front wheel 31 turns about a second turning axis 312.

In this manner, the first bracket 335 transfers the steering of the handlebar 23 to the left front wheel 31. Similarly, the second bracket 336 transfers the steering of the handlebar 23 to the right front wheel 32.

FIG. 5 is an overall front view of the vehicle 1 that leans the vehicle body at an angle T in the left-and-right direction relative to a perpendicular direction from the state shown in FIG. 2. When the vehicle 1 is caused to lean relative to the perpendicular direction, the link mechanism 5 is actuated.

As this occurs, the upper cross portion 51 and the lower cross portion 52 are translated horizontally in the left-and-right direction while the directions in which they extend are kept parallel or substantially parallel to the road surface G. The upper cross portion 51 and the lower cross portion 52 turn about the upper left axis M2 and the lower left axis M5, respectively, relative to the left side portion 53. Additionally, the upper cross portion 51 and the lower cross portion 52 turn about the upper right axis M3 and the lower right axis M6, respectively, relative to the right side portion 54.

In this manner, when the vehicle is seen from the front, with the vehicle resting in the upright state, the upper cross portion 51, the lower cross portion 52, the left side portion 53, and the right side portion 54 define a rectangle, and when the vehicle is caused to lean, the link mechanism 5 operates so that the rectangle changes to a parallelogram as the vehicle is caused to lean further.

In the following description, an area where the upper cross portion 51, the lower cross portion 52, the left side portion 53, and the right side portion 54 move is referred to as a movable range of the link mechanism 5.

In the present preferred embodiment, the link mechanism 5 operates so that a left end of the upper cross portion 51 moves farther horizontally leftwards than a left end of the lower cross portion 52. When the link mechanism 5 operates in this manner, the left shock absorber 33 and the right shock absorber 34 lean in relation to the vertical direction. When the vehicle 1 leans to the left in relation to the vertical direction in the manner described above, the state of the vehicle 1 changes from the state shown in FIG. 2 to the state shown in FIG. 5.

The vehicle 1 according to the preferred embodiment is turned by causing the vehicle body to lean while the vehicle 1 is running. Additionally, the directions of the left front wheel 31 and the right front wheel 32 are also changed by operating the handlebar 23.

Next, rigidities of the upper cross portion 51 and the lower cross portion 52 will be described. In the following description, the rigidities of the upper cross portion 51 and the lower cross portion 52 (hereinafter, when both the cross portions are not discriminated from each other, the upper cross section 51 and the lower cross section 52 are referred to simply as a cross portion) refers to the difficulty that the cross portion has in deflecting when a force acting in the front-and-rear direction of the vehicle body is exerted on the cross portion. In the following description, the upper cross portion 51 and the lower cross section 52 are referred to as a cross portion altogether.

The left front wheel 31 and the right front wheel 32 of the vehicle 1 are each supported independently. Because of this, there are situations in which different forces are exerted on the left front wheel 31 and the right front wheel 32 at different timings. For example, when the brakes are applied or the vehicle 1 rides over irregularities on the road surface, an external force is transferred to the link mechanism 5. As this occurs, there are situations in which force components in the front-and-rear direction that are different in magnitude or direction are exerted on the left and right sides of the cross portion or in which a force component in the front-and-rear direction is exerted on the left and right of the cross portion at different timings. Even in such a case, the cross portion is required to have a certain difficulty in deflecting when a force in the front-and-rear direction is exerted thereon so as to maintain the smooth operation of the link mechanism 5. To meet this requirement, the right side portion 54, the left side portion 53, the upper cross portion 51, and the lower cross section 52 of the vehicle 1 of the present preferred embodiment have high rigidities to maintain the smooth operation of the link mechanism 5.

The right side portion 54, the left side portion 53, the upper cross portion 51, and the lower cross portion 52 that define the link mechanism 5 are highly rigid to enhance the function of turning smoothly and the function of transferring loads. This enlarges the external shapes of the right side portion 54, the left side portion 53, the upper cross portion 51, and the lower cross portion 52. Additionally, this also enlarges the external shape of the link mechanism 5 made up of those portions. Further, the movable range of the link mechanism 5 is also enlarged further. The vehicle that includes the body frame 21 that can lean and the two front wheels 31, 32 includes around the periphery of the steering shaft 60 the large link mechanism 5 that moves as the body frame 21 leans. Because of this, in the vehicle including the body frame 21 that can lean and the two front wheels 31, 32, on-board components need to be provided so that the on-board components do not interfere with the movable range of the link mechanism 5. Because of this, in the vehicle that includes the body frame 21 that can lean and the two front wheels 31, 32, the construction around the periphery of the steering shaft 60 tends to be increased in size.

The inventor of preferred embodiments of the present invention has analyzed in detail the function of the link mechanism 5. The link mechanism 5 includes the function of enabling the right side portion 54 or the left side portion 53 to turn smoothly relative to the upper cross portion 51 and the lower cross portion 52 and the function of enabling the upper cross portion 51 and the lower cross portion 52 to turn smoothly relative to the body frame 21. Additionally, the link mechanism 5 includes the function of transferring loads received by the right side portion 54 or the left side portion 53 to the body frame 21. The inventor's analysis has discovered the fact that the load received by the link mechanism 5 includes loads in the direction of the rotational axes (the upper middle axis M1, the upper left axis M2, the upper right axis M3, the lower middle axis M4, the lower left axis M5, and the lower right axis M6) of the upper cross portion 51, the lower cross portion 52, the left side portion 53, and the right side portion 54 and loads in directions that extend in the up-and-down direction of the body frame 21 and that are vertical to the rotational axes. Further, the inventor's analysis has also discovered the fact that the smooth operation of the link mechanism 5 is easily maintained by making the rigidity of the upper cross portion 51 to the load in the direction of the rotational axes equal or substantially equal to the rigidity of the lower cross portion 52.

The rigidity of the cross portion of the link mechanism 5 includes a rigidity component attributed to the shape, thickness, volume and the like of the cross portion itself and a rigidity component attributed to the type, size and the like of the upper middle bearing 511 or the lower middle bearing 521. Then, it is possible to know the rigidity of the cross section based on a displacement of the cross portion that will be measured, as described below. It will be shown that the smaller a displacement, the larger the rigidity.

Figure 6A:
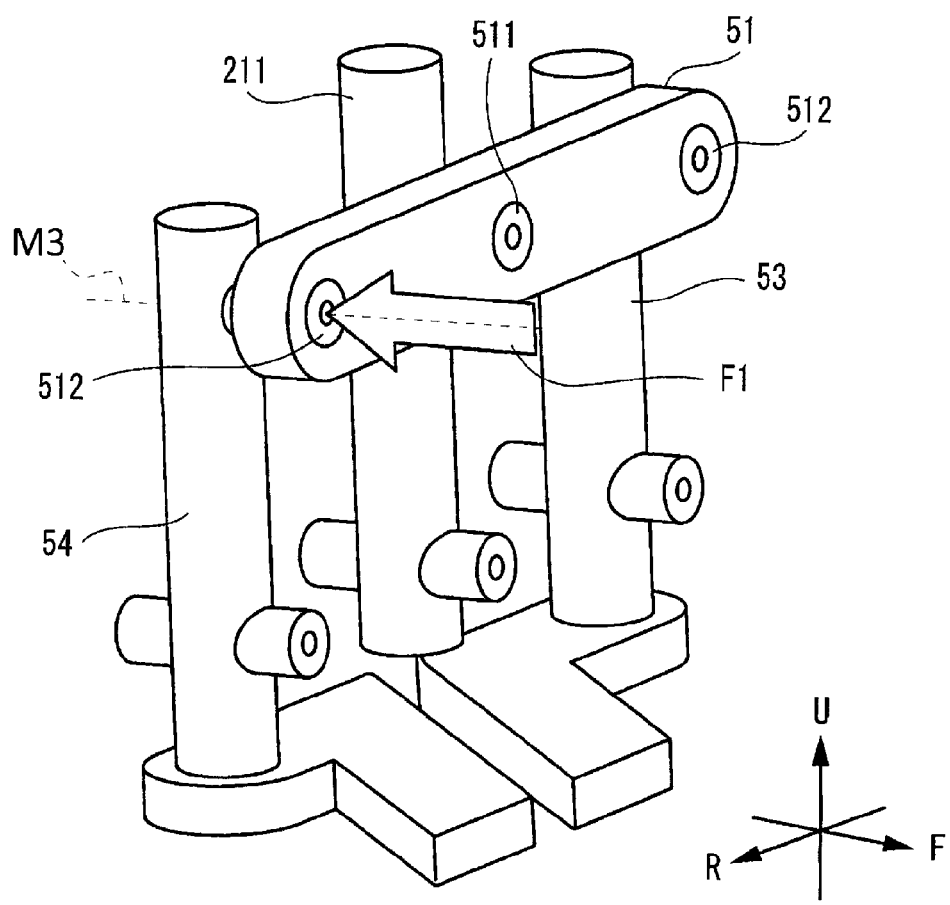
FIGS. 6A and 6B schematically show how to measure a rigidity of an upper cross portion.
Figure 6B:
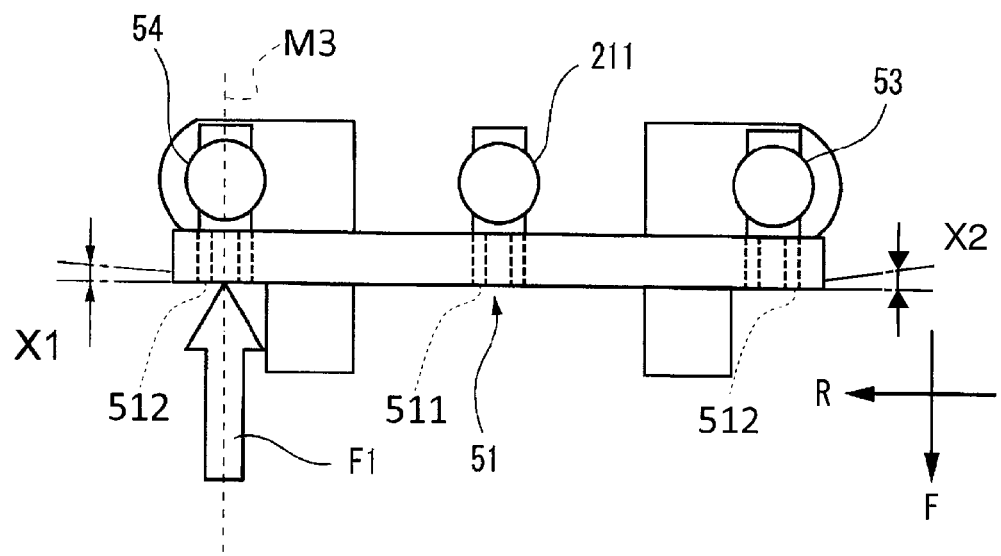
Figure 7A:
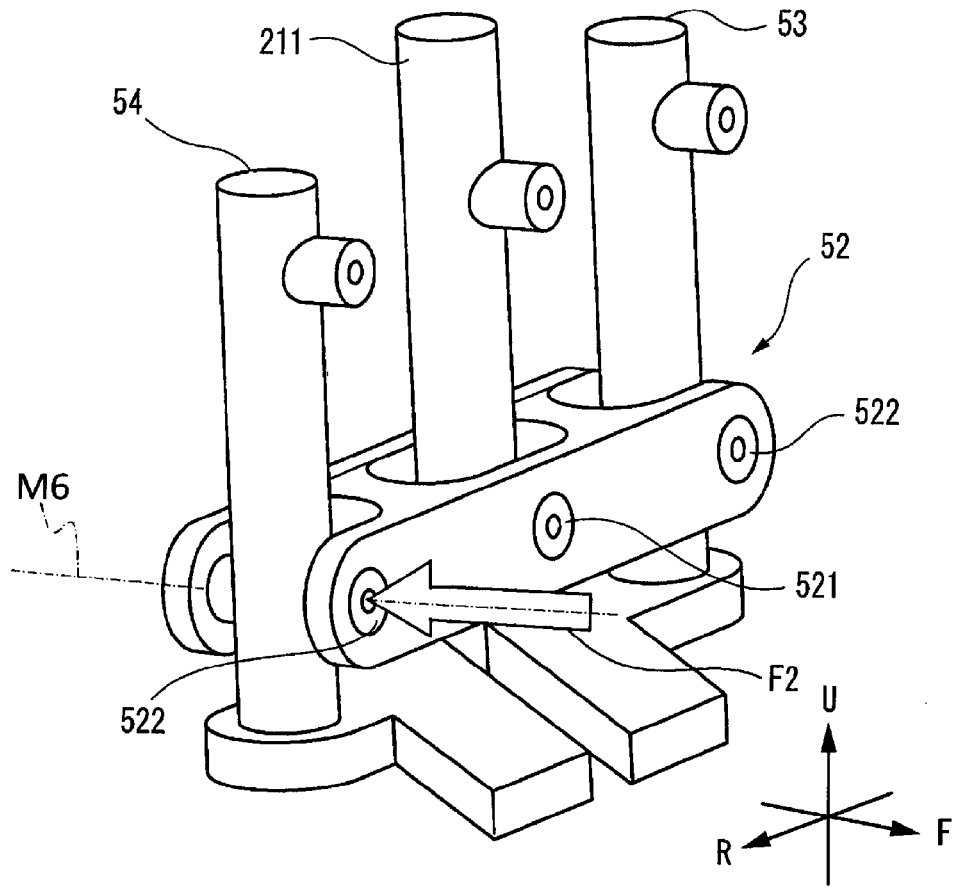
FIGS. 7A and 7B schematically show how to measure a rigidity of a lower cross portion.
Figure 7B:
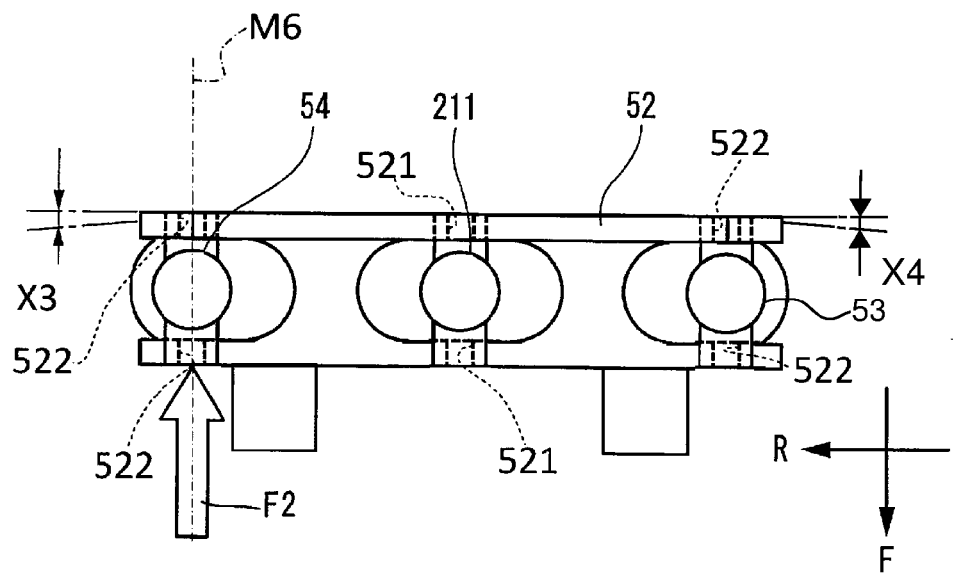

FIGS. 6A and 6B are schematic drawings showing how to evaluate the rigidity of the upper cross portion 51. FIG. 6A is a perspective view of an upper portion of the link mechanism 5, and FIG. 6B is a plan view of the upper portion of the link mechanism 5. FIGS. 7A and 7B are schematic drawings showing how to evaluate the rigidity of the lower cross portion 52. FIG. 7A is a perspective view of the upper portion of the link mechanism 5, and FIG. 7B is a plan view of the upper portion of the link mechanism 5.

As shown in FIG. 6A, the lower cross portion 52 is removed from the headpipe 211. In this state, the upper middle bearing 511, the upper left bearing 512, and the upper right bearing 512 are kept mounted in the upper cross portion 51. A displacement X1 of the upper cross portion is measured when a rearward test force F1 in the direction of the upper right axis M3 is exerted on the upper right bearing 512 with the lower cross portion 52 removed.

Similarly, a displacement X2 of the upper cross portion 51 is measured when a force the same in magnitude and direction (a rearward direction in the direction of the upper left axis M2) as the test force F1 is exerted on the upper left bearing 512 with the lower cross portion 52 removed.

Next, as shown in FIGS. 7A and 7B, the upper cross portion 51 is removed from the headpipe 211. In this state, the lower middle bearing 521, the lower left bearing 522, and the lower right bearing 522 are kept mounted in the lower cross portion 52. A displacement X3 of the lower cross portion 52 is measured when a force the same in magnitude and direction (a rearward direction in the direction of the lower right axis M6) as the test force F1 is exerted on the lower right bearing 522 with the upper cross portion 51 removed.

Similarly, a displacement X4 of the lower cross portion 52 is measured when a force F2 the same in magnitude and direction (a rearward direction in the direction of the lower left axis M5) as the test force F1 is exerted on the lower left bearing 522 with the upper cross portion 51 removed.

As in the upper left bearing 512 and the lower left bearing 522 or the upper right bearing 512 and the lower right bearing 522, the test force is exerted only on one of the left and right bearings of the upper cross portion 51 and the lower cross portion 52. By doing so, a force exerted on the upper cross portion 51 and the lower cross portion 52 when the brakes are applied or the vehicle rides over irregularities on the road surface is simulated.

When the displacements X1, X2, X3, and X4 are measured in the manner described above, in the vehicle 1 of the present preferred embodiment, the displacements X1 to x4 are preferably equal or substantially equal to one another. Here, it is understood that the displacements X1 to X4 are defined to be equal or substantially equal to one another when a difference between a largest displacement and a smallest displacement in terms of absolute value is equal to or smaller than 20% of a mean value of the displacements X1 to X4.

In the vehicle 1 of the present preferred embodiment, the upper cross portion 51 does not include a member that corresponds to the connecting portion 52b of the lower cross portion 52. In particular, the upper cross portion 51 is higher than the headpipe 211, and no cross portion 51 is provided farther rearward than the headpipe 211. In contrast with this, the lower cross portion 52 includes the portions that are located at the front and rear of the headpipe 211.

Further, the upper middle bearing 511 is provided farther forward than the headpipe 211, and no bearing is provided farther rearward than the headpipe 211. In contrast with this, the lower middle bearings 521 are provided at the front and rear sides of the headpipe 211. The same bearings are preferably used for the upper middle bearing 511 and the lower middle bearings 521.

Because of this, in the vehicle 1 of the present preferred embodiment, the rigidity of the upper cross portion 51 is preferably equal or substantially equal to that of the lower cross portion 52 by using at least one of the following configurations (1) to (4) or a combination thereof. Configuration (1), a thickness in the front-and-rear direction of the upper cross portion 51 is larger than the thickness of each of the front lower cross portion 52a1 and the rear lower cross portion 52a2 of the lower cross portion 52. Configuration (2), the upper cross portion 51 is larger than the front lower cross portion 52a1 that defines the front portion of the lower cross portion 52. Configuration (3), the upper middle bearing 511 of the upper cross portion 51 is larger than the lower middle bearings 521 of the lower cross portion 52. Configuration (4), the upper middle bearing 511 of the upper cross portion 51 includes a plurality of bearings. All the configurations (1) to (4) may be used.

According to the vehicle 1 of the present preferred embodiment, the movable range of the link mechanism 5 is changed from a simple shape like a rectangular parallelepiped to an irregular shape by making the volume of the upper cross portion 51 that includes the portions supporting the right side portion 54 and the left side portion 53 and the portion supported on the body frame 21 differ from the volume of the lower cross portion 52 that includes the portions supporting the right side portion 54 and the left side portion 53 and the portion supported on the body frame 21.

The inventor discovered that it is preferable from the analysis to make the rigidity of the upper cross portion 51 equal or substantially equal to the rigidity of the lower cross portion 52 to enable the smooth operation of the link mechanism 5. It is general practice and is reasonable to make the upper cross section and the lower cross section identical to each other in order for them to have the same rigidity.

However, the inventor has discovered that the utilization efficiency of the peripheral space of the steering shaft 60 cannot be enhanced in case the upper cross portion and the lower cross portion are identical. Then, the inventor realized that it is useful to make the volume of the upper cross portion 51 different from the volume of the lower cross portion 52 to enhance the utilization efficiency of the peripheral space of the steering shaft 60 while making the volume of the upper cross portion 51 different from the volume of the lower cross portion 52. In the event that the volume of the upper cross portion 51 differs from the volume of the lower cross portion 52, the upper cross portion 51 and the lower cross portion 52 are able to have different shapes. The link mechanism 5 is allowed to have an irregular movable range by making use of the configuration in which the upper cross portion 51 and the lower cross portion 52 have different shapes, thus making it possible to make effective use of the peripheral space of the steering shaft 60. Further, the upper cross portion 51 and the lower cross portion 52 preferably have the same rigidity, and therefore, the smooth operation of the link mechanism 5 is easily maintained.

In the present preferred embodiment, the upper cross portion 51 is positioned farther forward than the headpipe 211 and no cross portion is provided farther rearward than the headpipe 211. Additionally, the lower cross portion 52 includes the portion positioned farther rearward than the headpipe 211 and the portion positioned farther forward than the headpipe 211. This makes the movable range of the link mechanism 5 into a shape in which, in the front-and-rear direction of the body frame 21, a dimension increases from top to bottom in relation to the up-and-down direction of the body frame 21. This makes it easy to dispose on-board components in an area around the periphery of the steering shaft 60 and near the upper portion of the link mechanism 5.

Specifically, the upper cross portion 51 preferably includes a single plate-shaped member and, as shown in FIG. 4, no member of the link mechanism 5 is provided at the upper portion of and farther rearward than the link mechanism 5. This enables an upper portion of the space where the link mechanism 5 operates (the movable range of the link mechanism) smaller than the movable range of the link mechanism of Japanese Patent Unexamined publication JP-A-2005-313876. Then, the body frame or accessories can be disposed in the upper space farther rearward than the link mechanism 5. Alternatively, the front cover 221 is smaller in size by an area corresponding to the upper rear space. Here, accessories include a hydraulic unit of ABS (Antilock Brake System), headlamp, horn, turn signals, radiator, battery, anti-theft device, brake hose, brake wire, fasteners for brake hose and brake wire, body cover, various meters, and the like.

In the space at the front portion of the vehicle, a member of the body frame is large or an additional member is disposed in the upper space located farther rearward than the link mechanism 5, such that it is possible to enhance the rigidity of the vehicle.

Alternatively, the space may be used to dispose the accessories or as a storage space. By doing so, positions where to dispose the equipment are freely designed at the front portion of the vehicle. Additionally, it is possible to improve the external design.

In this manner, according to the vehicle of the present preferred embodiment, the degree of freedom in designing the periphery of the steering shaft 60 is enhanced by changing the movable range of the link mechanism 5 from the simple shape like a rectangular parallelepiped to the irregular shape. As a result of this, even though various on-board components that differ in size and the link mechanism 5 are disposed around the periphery of the steering shaft 60, it is possible to prevent the enlargement of the periphery.

Moreover, even though the volume of the upper cross portion 51 is made to differ from the volume of the lower cross portion 52 to change the movable range of the link mechanism 5 from the simple shape like a rectangular parallelepiped to the irregular shape, the rigidity of the upper cross portion 51 to the load in the direction of the rotational axis is kept equal or substantially equal to that of the lower cross portion 52. This makes it easy to maintain the smooth operation of the link mechanism 5.

Consequently, it is possible to prevent the enlargement of the peripheral construction of the steering shaft 60 located above the two front wheels 31, 32 while the function of the link mechanism 5 is maintained in the vehicle 1 that includes the body frame 21 that can lean and the two front wheels 31, 32.

In particular, a display portion and the body frame are disposed densely behind the headpipe 211 in many cases. Because of this, it is preferably that no member of the upper cross portion 51 is provided on the headpipe 211 since the space is effectively used for other applications. For example, the front frame 212 can be connected directly to the headpipe 211 without interposing a support member or the like therebetween, thus making it possible to enhance the rigidities of the front frame 212 and the headpipe 211.

Additionally, the upper cross portion 51, the lower cross portion 52, the left side portion 53, and the right side portion 54 of the link mechanism 5 are turnably supported by the bearings 511, 512, 521, and 522. This enhances the rigidity of the link mechanism 5.

In the vehicle 1 according to the present preferred embodiment, the material of the upper cross portion 51 is preferably the same as the material of the lower cross portion 52 in the link mechanism 5. Even though the material of the upper cross portion 51 is preferably the same as the material of the lower cross portion 52, as has been described above, the movable range of the link mechanism 5 is changed from the simple shape like a rectangular parallelepiped to the irregular shape by making the volume of the upper cross portion 51 different from the volume of the lower cross portion 52. This enhances the degree of freedom in designing the periphery of the steering shaft 60. As a result of this, even though various on-board components that differ in size and the link mechanism 5 are disposed around the periphery of the steering shaft 60, it is possible to prevent the enlargement of the periphery thereof.

Alternatively, different from the preferred embodiments described above, different materials may be used for the upper cross portion 51 and the lower cross portion 52 of the link mechanism 5. In the event that the upper cross portion 51 is made of a material higher in rigidity than a material of which the lower cross portion 52 is made, the volume of the upper cross portion 51 is preferably smaller than that of the lower cross portion 52 while making the rigidity of the upper cross portion 51 to the load in the direction of the rotational axis equal or substantially equal to that of the lower cross portion 52. This enables the movable range of the link mechanism 5 to be changed from the simple shape like a rectangular parallelepiped to the irregular shape. This enhances the degree of freedom in designing the periphery of the steering shaft 60. As a result of this, even though various on-board components that differ in size and the link mechanism 5 are disposed around the periphery of the steering shaft 60, it is possible to prevent the enlargement of the periphery.

Contrary to this, in the event that the upper cross portion 51 is made of a material higher in rigidity than a material of which the lower cross portion 52 is made, the volume of the upper cross portion 51 is preferably made smaller than that of the lower cross portion 52 while making the rigidity of the upper cross portion 51 to the load in the direction of the rotational axis equal or substantially equal to that of the lower cross portion 52.

In the vehicle 1 according to the present preferred embodiment, in the link mechanism 5, the volume of the upper cross portion 51 is smaller than the volume of the lower cross portion 52. According to the vehicle of the present preferred embodiment that includes the body frame 21 that can lean and the two front wheels 31, 32, the volume of the upper cross portion 51 is smaller than that of the lower cross portion 52, and therefore, the movable range of the link mechanism 5 is changed from the simple shape like a rectangular parallelepiped to the irregular shape in which the upper portion is smaller than the lower portion. This enhances the degree of freedom in designing the peripheral space of the upper cross portion 51 that is located at the front of the vehicle. As a result of this, even though various on-board components that differ in size and the link mechanism 5 are disposed around the periphery of the steering shaft 60, it is possible to prevent the enlargement of the periphery.

As shown in FIG. 4, in the vehicle 1 according to the present preferred embodiment, the body frame 21 includes the headpipe 211 that turnably supports the upper cross portion 51 and the lower cross portion 52. The upper cross portion 51 is provided forward of the headpipe 211 and no such member is provided behind the headpipe 211.

According to the vehicle of the present preferred embodiment that includes the body frame 21 that can lean and the two front wheels 31, 32, the upper cross portion 51 is provided only at the front of the headpipe 211, and therefore, the movable range of the link mechanism 5 is changed from the simple shape like a rectangular parallelepiped to the irregular shape in which the upper portion is smaller than the lower portion. This enhances the degree of freedom in designing the periphery of the steering shaft 60. As a result of this, even though various on-board components that differ in size and the link mechanism 5 are disposed around the periphery of the steering shaft 60, it is possible to prevent the enlargement of the periphery.

Different from the preferred embodiments described above, a configuration may be used in which the upper cross portion 51 is provided rearward of the headpipe 211, and no such member is provided forward of the headpipe 211. Even with this configuration, as with the configuration described above, the movable range of the link mechanism 5 changes into the irregular shape in which the upper portion is smaller than the lower portion.

Alternatively, a configuration may be used in which the lower cross portion 52 is provided either forward of or rearward of the headpipe 211 and does not have to be provided at both locations. This configuration also allows the movable range of the link mechanism 5 to change into an irregular shape in which a lower portion is smaller than an upper portion.

As shown in FIG. 4, in the vehicle according to the present preferred embodiment, a front end of the upper cross portion 51 and a front end of the lower cross portion 52 are provided in different positions in relation to the direction of the upper right axis M3.

According to the vehicle that includes the body frame 21 that can lean and the two front wheels 31, 32, the front end of the upper cross portion 51 and the front end of the lower cross portion 52 are provided in the different positions in the direction of the upper right axis M3, and therefore, the movable range of the link mechanism 5 is changed from the simple shape like a rectangular parallelepiped to a shape irregular in the front-and-rear direction. This enhances the degree of freedom in designing the periphery of the steering shaft 60. As a result of this, even though various on-board components that differ in size and the link mechanism 5 are disposed around the periphery of the steering shaft 60, it is possible to prevent the enlargement of the periphery thereof.

In the vehicle according to the present preferred embodiment, the link mechanism 5 is configured such that the rear end of the upper cross portion 51 and the rear end of the lower cross portion 52 are provided in different positions in the direction of the upper right axis.

According to the vehicle of the present preferred embodiment, the rear end of the upper cross portion 51 and the rear end of the lower cross portion 52 are provided in different positions in the direction of the upper right axis M3, and therefore, the movable range of the link mechanism 5 is changed from the simple shape like a rectangular parallelepiped to a shape irregular in the front-and-rear direction. This enhances the degree of freedom in designing the periphery of the steering shaft 60. As a result of this, even though various on-board components that differ in size and the link mechanism 5 are disposed around the periphery of the steering shaft 60, it is possible to prevent the enlargement of the periphery.

In the vehicle according to the present preferred embodiment, the headpipe 211 turnably supports the upper cross portion 51 and the lower cross portion 52 turnably supports the steering shaft 60.

According to the vehicle 1 of the present preferred embodiment that includes the body frame 21 that can lean and the two front wheels 31, 32, the headpipe 211 supports the link mechanism 5 that supports, in turn, the right front wheel 32, the left front wheel 31, the right shock absorber 34, and the left shock absorber 33 and includes a high rigidity. Because of this, the steering shaft 60 is supported by a highly rigid structure, such that the configuration in which the steering shaft 60 is supported is simplified. As a result, it is possible to prevent the enlargement of the peripheral construction of the steering shaft 60.

In addition, the lower cross portion 52 is configured so as to include the front lower cross portion 52a1 and the rear lower cross portion 52a2 that hold the headpipe 211 from the front and rear therebetween. In the lower cross portion 52, it is possible to obtain the high rigidity by using a thin plate material.

In addition, the upper cross portion 51 is mounted on the headpipe 211 only via the single upper middle bearing 511. In contrast to this, the lower cross portion 52 includes the lower middle bearings 521 that are provided at the front and rear of the headpipe 211. Namely, the lower cross portion 52 is supported on the headpipe 211 at the two points that are spaced apart from each other in the front-and-rear direction. By using this configuration, is high rigidity of the lower cross portion 52 is easily provided. Additionally, the loads that are exerted on the lower middle bearings 521 that support the lower cross portion 52 are mitigated. This allows the use of a bearing having a relatively small withstand load for the lower middle bearing 521 which is required to have a large withstand load.

In addition, the upper cross portion 51 is provided only at the front of the headpipe 211, and the front lower cross portion 52a1 and the rear lower cross portion 52a2 of the lower cross portion 52 are provided at both the front side and the rear side of the headpipe 211. By using this configuration, the supporting rigidity with which the lower cross portion 52 supports the left side portion 53 and the right side portion 54 becomes larger than the supporting rigidity with which the upper cross portion 51 supports the left side portion 53 and the right side portion 54. In this manner, the left side portion 53 and the right side portion 54 are supported by the lower cross portion 52 that has a large supporting rigidity in the positions near the front wheels 31, 32. This ensures that the link mechanism 5 has the rigidity required to withstand the external forces exerted on the front wheels 31, 32 with ease.

Additionally, as described in FIG. 4, in this preferred embodiment, the lower surface C of the upper cross portion 51 is located between the upper surface A of the front lower cross portion 52a1 that defines the front portion and the upper surface B of the rear lower cross portion 52a2 that defines the rear portion of the lower cross portion 52 in relation to the front-and-rear direction of the body frame 21. By using this configuration, even though the link mechanism 5 is actuated as a result of the vehicle 1 being caused to lean, there is no such situation that the upper cross portion 51 interferes with the lower cross portion 52. This allows a distance between the upper cross portion 51 and the lower cross portion 52 to be reduced, thus making it possible to reduce a dimension in the up-and-down direction of the link mechanism 5. This allows the space at the front portion of the vehicle to be further effectively used.

In addition, in the present preferred embodiment, the displacement of the upper cross portion 51 resulting when the rearward test force F1 is exerted on the upper cross portion 51 is equal or substantially equal to the displacement of the lower cross portion 52 resulting when the forward test force F2 is exerted on the lower cross portion 52, and the displacement of the upper cross portion 51 resulting when the forward test force F1 is exerted on the upper cross portion 51 is equal or substantially equal to the displacement of the lower cross portion 52 resulting when the rearward test force F2 is exerted on the lower cross portion 52.

While the present invention has been described with respect to the preferred embodiments above, the technical scope of the present invention is not limited by the scope described in the preferred embodiments described above. It is obvious to those skilled in the art to which the present invention pertains that various alterations or improvements can be made to the preferred embodiments.

For example, in the preferred embodiments above, the upper cross portion 51 and the lower cross portion 52 are described as being made of the same material and having different volumes so that the displacements X1 to X4 are equal or substantially equal by making their volumes different from each other. However, the approach of making the displacements X1 to X4 equal or substantially to one another by making the volumes different from each other is not limited to the approach described in the preferred embodiments. For example, different materials may be used, and further, the volumes may also be different.

For example, the upper cross portion 51 may be made of a material having a higher rigidity than that of a material of the lower cross portion 52. By using this approach, the volume of the upper cross portion 51 is reduced by reducing the thickness of the upper cross portion 51. Then, the upper portion of the link mechanism 5 is made smaller in size, such that the peripheral space of the upper portion of the link mechanism 5 can be used for other applications. In particular, this enhances the degree of freedom in designing the peripheral space of the upper cross portion 51.

In addition, in the preferred embodiments described above, plate members having the same shape are used for the upper cross portion 51 and the lower cross portion 52, and in order for the upper cross portion 51 and the lower cross portion 52 to have different volumes, the upper cross portion 51 includes one plate member, while the lower cross portion 52 includes two plate members. However, the approach of having the different volumes is not limited to the approach described in the preferred embodiments. For example, it is possible to use an approach of using members which are different in cross-sectional area and cross-sectional shape in addition to different thickness for the upper cross portion 51 and the lower cross portion 52, or an approach of providing or not providing a reinforcement rib to enhance the rigidity of the upper cross portion 51 and the lower cross portion 52. Further, different bearings may be used for the upper middle bearing 511 and the lower middle bearings 521. It is noted that when referred to herein, the description that the volumes of the upper cross portion and the lower cross portion differ indicates that a difference in volume that does not largely affect the rigidities of the cross sections is not included in the difference in volume referred to above.

In the preferred embodiments, the upper space located behind the link mechanism 5 is described as being used for other applications including the application in which accessories are disposed in the space, the present invention is not limited thereto. For example, a configuration may be used in which the rigidities of the upper cross portion 51 and the lower cross portion 52 are equal or substantially equal, and the single upper cross portion 51 is provided behind the headpipe 211 so that the front upper space of the link mechanism 5 is used for other applications.

In addition, a configuration may be used in which the link mechanism 5 is constructed upside down compared with the construction described in the preferred embodiments above. Specifically, an upper cross portion 51 includes two cross portions, that is, a front upper cross portion and a rear upper cross portion that hold the headpipe 211 from the front and rear therebetween, while a single lower cross portion 52 is provided either only at the front or only at the rear of the headpipe 211. As this occurs, a front lower or a rear lower portion of the link mechanism 5 can be used for other applications.

Additionally, in the preferred embodiments described above, while the link mechanism 5 is described as including the upper cross portion 51 and the lower cross portion 52, the present invention is not limited thereto. For example, as the link mechanism, a link mechanism may be used which is configured to include three or more cross portions such as a link mechanism including an upper cross portion, a lower cross portion, and a middle cross portion provided between the upper cross portion and the lower cross portion.

In addition, in the preferred embodiments described above, while the upper cross portion 51 and the lower cross portion 52 are described as being mounted on the headpipe 211 that turnably supports the steering shaft 60, the invention is not limited thereto. For example, the upper cross portion 51 and the lower cross portion 52 may be mounted at a location that extends upwards and forwards from the front frame 212 or a member mounted on the front frame 212 so as to extend upwards and forwards.

In the preferred embodiments described above, as shown in FIG. 4, the lower cross portion 52 includes the front lower cross portion 52a1 and the rear lower cross portion 52a2 that are connected, respectively, to the front and rear of the headpipe 211 in such a manner as to hold the headpipe 211 therebetween in the front-and-rear direction of the body frame 21. Additionally, the upper cross portion 51 is provided only at the front of the headpipe 211 in relation to the front-and-rear direction of the body frame 21. However, the present invention is not limited thereto.

Figure 8:
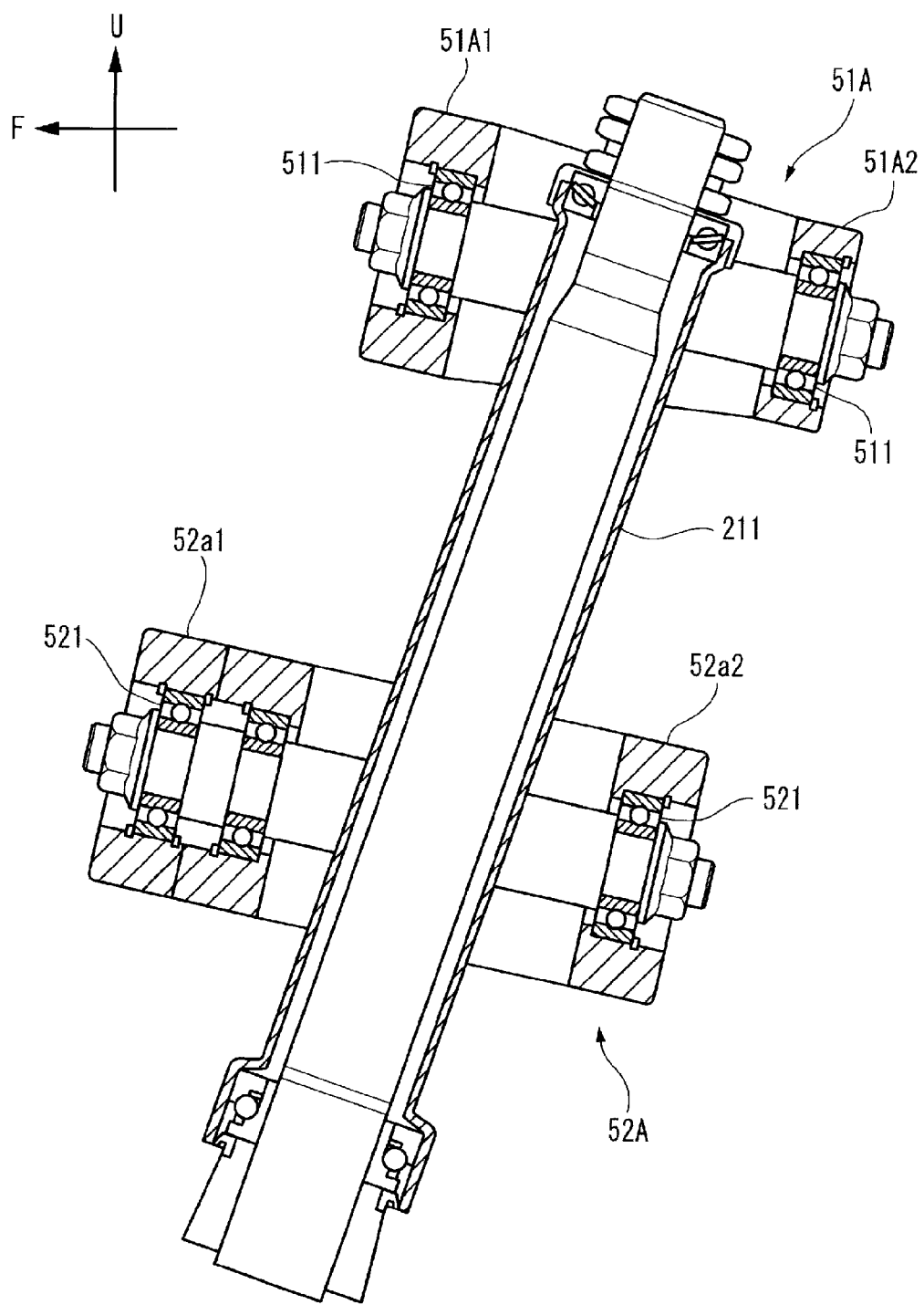
FIG. 8 is a drawing similar to FIG. 4 showing a vehicle according to a modified preferred embodiment of the present invention.

For example, as shown in FIG. 8, a configuration may be used in which an upper cross portion 51A includes a front upper cross portion 51A1 and a rear upper cross portion 51A2 that are individually connected to a headpipe 211 in such a manner as to hold the headpipe 211 therebetween in a front-and-rear direction of a body frame 21. As this occurs, the front upper cross portion 51A1 has a volume larger than that of the rear upper cross portion 51A2. By using this configuration, compared with a configuration in which the front upper cross portion 51A1 has a volume the same or substantially the same as that of the rear upper cross portion 51A2, the degree of freedom in designing a connecting portion of a front frame 212 to the headpipe 211 is enhanced. It is noted that in the configuration shown in FIG. 8, displacements X1 to X4 are equal or substantially equal to one another.

Additionally, as this occurs, as shown in FIG. 8, the volume of the front upper cross portion 51A1 may be smaller than a volume of the front lower cross portion 52a1 that is located at a front portion of the lower cross portion 52.

It is preferable that no constituent member of the link mechanism 5 is provided behind the headpipe 211 as shown in FIG. 4. In the event that the configuration shown in FIG. 4 is used, the front frame 212 does not have to be connected to the headpipe 211 in such a manner as to bypass the rear upper cross portion 51A2. Because of this, the front frame 212 can be connected to the headpipe 211 behind the upper cross portion 51. By doing so, the rigidities of the front frame 212 and the headpipe 211 are enhanced without enlarging the front portion of the vehicle.

As shown in FIG. 8, in the vehicle 1 according to the modified example, the body frame 21 includes the headpipe 211 that turnably supports the upper cross portion 51A and the lower cross portion 52A. In the link mechanism 5, the front upper cross portion 51A1 that defines a front portion of the upper cross portion 51A that is located farther forward than the headpipe 211 in the direction of an upper right axis M3 has a smaller volume than that of a front lower cross portion 52a1 that defines a front portion of the lower cross portion 52A that is located farther forward than the headpipe 211.

According to the vehicle of this modified example that includes the body frame 21 that can lean and two front wheels 31, 32, the volume of the front upper cross portion 51A1 that defines the front portion of the upper cross portion 51A that is located farther forward than the headpipe 211 is smaller than the volume of the front lower cross portion 52a1 that defines the front portion of the lower cross portion 52 that is located farther forward than the headpipe 211. Therefore, a movable range of the link mechanism 5 is changed from a simple shape like a rectangular parallelepiped to an irregular shape in which a front upper portion is smaller than a front lower portion. It is possible to enhance the degree of freedom in designing a peripheral space of the upper cross portion 51A1. As a result of this, even though various on-board components that differ in size and the link mechanism 5 are disposed around the periphery of the steering shaft 60, it is possible to prevent the enlargement of the periphery thereof.

In the vehicle according to a preferred embodiment, the body frame 21 includes the headpipe 211 that defines a portion of the body frame 21 that turnably supports the upper cross portion 51A and the lower cross portion 52A. The volume of the front upper cross portion 51A1 that defines the front portion of the upper cross portion 51A that is located farther forward than the headpipe 211 in the direction of the upper right axis M3 differs from the volume of the rear upper cross portion 51A2 that defines a rear portion of the upper cross portion 51A that is located farther rearward than the headpipe 211.

According to the vehicle of a preferred embodiment that includes the body frame 21 that can lean and the two front wheels 31, 32, the volume of the front upper cross portion 51A1 that is located farther forward than the headpipe 211 is different from the volume of the rear upper cross portion 51A2 that is located farther rearward than the headpipe 211. Therefore, the movable range of the link mechanism 5 is changed from the simple shape like a rectangular parallelepiped to the irregular shape. This enhances the degree of freedom in designing the space around the periphery of the rear portion of the upper cross portion 51A. As a result of this, even though various on-board components that differ in size and the link mechanism 5 are disposed around the periphery of the steering shaft 60, it is possible to prevent the enlargement of the periphery thereof.

In the vehicle according to a preferred embodiment, the body frame 21 includes the headpipe 211 that turnably supports the upper cross portion 51A and the lower cross portion 52A. In the link mechanism 5, the volume of the front lower cross portion 52a1 that defines the front portion of the lower cross portion 52A that is located farther forward than the headpipe 211 in the direction of the upper right axis M3 differs from the volume of the rear lower cross portion 51a2 that defines a rear portion of the lower cross portion 52A that is located farther rearward than the headpipe 211.

According to the vehicle of a preferred embodiment that includes the body frame 21 that can lean and the two front wheels 31, 32, the volume of the front lower cross portion 52a1 that is located farther forward than the headpipe 211 differs from the volume of the rear lower cross portion 52a2 that is located farther rearward than the headpipe 211, and therefore, the movable range of the link mechanism 5 is changed from the simple shape like a rectangular parallelepiped to the irregular shape.

This enhances the degree of freedom in designing the peripheral space at the rear portion of the lower cross portion 52A. As a result of this, even though various on-board components that differ in size and the link mechanism 5 are disposed around the periphery of the steering shaft 60, it is possible to prevent the enlargement of the periphery thereof.

In the vehicle 1 according to a preferred embodiment, the upper cross portion 51A includes a front upper cross portion 51A1 (an example of an upper front portion) that is located farther forward than the headpipe 211 in the direction of the upper right axis M3 and a rear upper cross portion 51A2 (an example of an upper rear portion) that is located farther rearward than the headpipe 211.

According to the vehicle 1 of a preferred embodiment that includes the body frame 21 that can lean and the two front wheels 31, 32, the upper cross portion 51A includes the front upper cross portion 51A1 that is located farther forward than the headpipe 211 and the rear upper cross portion 51A2 that is located farther rearward than the headpipe 211, and therefore, the balance between the rigidity and the volume of the upper cross portion 51A is easily controlled. This enhances the degree of freedom in designing the periphery of the lower portion of the steering shaft 60. This enhances the degree of freedom in designing the space around the periphery of the upper cross portion 51. As a result of this, even though various on-board portions having different sizes and the link mechanism 5 are disposed around the periphery of the steering shaft 60, it is possible to prevent the enlargement of the periphery of the steering shaft 60.

According to a preferred embodiment, compared with a case where only the upper front portion is disposed at the front of the headpipe and no portion is disposed at the rear of the headpipe 211, or a case where only the upper rear portion is disposed at the rear of the headpipe and no portion is disposed at the front of the headpipe, since the upper front portion 51A1 and the upper rear portion 51A2 hold the headpipe therebetween, it is easy to enhance the rigidity of the upper cross portion 51A without enlarging the dimension of the portion in the front-and-rear direction of the body frame 21. This prevents the volume of the upper cross portion 51A from being increased while enhancing the rigidity of the upper cross portion 51A. This enhances the degree of freedom in designing the space around the periphery of the upper portion of the link mechanism. As a result of this, even though various on-board portions having different sizes and the link mechanism 5 are disposed around the periphery of the steering shaft 60, it is possible to prevent the enlargement of the periphery of the steering shaft 60.

In the vehicle according to a preferred embodiment, the lower cross portion 52A includes the front lower cross portion 52a1 (an example of a lower front portion) that is located farther forward than the headpipe 211 in the direction of the lower right axis M6 and the rear lower cross portion 52a2 (an example of a lower rear portion) that is located farther rearward than the headpipe 211.

According to the vehicle 1 of a preferred embodiment that includes the body frame 21 that can lean and the two front wheels 31, 32, the lower cross portion 52A includes the front lower cross portion 52a1 that is located farther forward than the headpipe 211 and the rear lower cross portion 52a2 that is located farther rearward than the headpipe 211, and therefore, the balance between the rigidity and volume of the lower cross portion 52A is easily controlled. This enhances the degree of freedom in designing the periphery of the lower portion of the steering shaft 60. This enhances the degree of freedom in designing the peripheral space at the rear portion of the lower cross portion 52A. As a result of this, even though various on-board portions having different sizes and the link mechanism 5 are disposed around the periphery of the steering shaft 60, it is possible to prevent the enlargement of the periphery of the steering shaft 60.

Compared with a case where only the lower front portion is disposed at the front of the headpipe and no portion is disposed at the rear of the headpipe, or a case where only the lower rear portion is disposed at the rear of the headpipe and no portion is disposed at the front of the headpipe, since the lower front portion 52a1 and the lower rear portion 52a2 hold the headpipe 211 therebetween, it is easy to enhance the rigidity of the lower cross portion 52A without enlarging the dimension of the portion in the front-and-rear direction of the body frame 21. This prevents the volume of the lower cross portion 52A from being increased while enhancing the rigidity of the lower cross portion 52A. This enhances the degree of freedom in designing the peripheral space at the rear portion of the link mechanism 5. As a result of this, even though various on-board portions having different sizes and the link mechanism 5 are disposed around the periphery of the steering shaft 60, it is possible to prevent the enlargement of the periphery of the steering shaft 60.

In the preferred embodiments and modified examples described above, while the headpipe 211 is described as defining a portion of the link supporting portion, the present invention is not limited thereto. The front frame 212 of the body frame 21 may be used to turnably support the link mechanism 5. Additionally, the link supporting portion may include a portion or a plurality of portions. In the case of the link supporting portion including a plurality of portions, the portions may be joined together through welding, bonding or the like. Alternatively, the portions may be joined together with fastening members such as bolts, rivets or the like.

The upper cross portion 51 may include an upper front cross portion, an upper rear cross portion, and a connecting member provided between the upper front and rear portions and including a plurality of portions. In the case of the link supporting portion including a plurality of portions, the portions may be joined together through welding, bonding or the like. Alternatively, the portions may be joined together with fastening members such as bolts, rivets or the like.

The lower cross portion 52 may include a lower front cross portion, a lower rear cross portion, and a connecting member provided between the lower front and rear portions and including a plurality of portions. In the case of the link supporting portion including a plurality of portions, the portions may be joined together through welding, bonding or the like. Alternatively, the portions may be joined together with fastening members such as bolts, rivets or the like.

Additionally, the right side portion 54 and the left side portion 53 may each be made up of a single portion or a plurality of portions. In the case of the link supporting portion including a plurality of portions, the portions may be joined together through welding, bonding or the like. Alternatively, the portions may be joined together with fastening members such as bolts, rivets or the like. In addition, the right side portion 54 and the left side portion 53 may each include a portion disposed farther forward or a portion disposed farther rearward in the front-and-rear direction of the body frame 21 than the upper cross portion 51 or the lower cross portion 52. The upper cross portion or the lower cross portion may be disposed between the portions that are disposed at the front and the portions that are disposed at the rear of the right side portion and the left side portion.

In the preferred embodiments described above, the right side portion 54, the left side portion 53, and the headpipe 211 are located at positions that are superposed one on another when the body frame 21 is seen from a side thereof. However, when the body frame 21 is seen from the side thereof, the headpipe 211 may be provided in a different position from positions where the right side portion 54 and the left side portion 53 are provided in relation to the front-and-rear direction. Additionally, leaning angles of the right side portion 54 and the left side portion 53 in relation to the up-and-down direction of the body frame 21 may differ from a leaning angle of the headpipe 211.

The vehicle according to preferred embodiments of the present invention is preferably a vehicle that includes the body frame 21 that can lean and the two front wheels 31, 32. The number of rear wheels is not limited to one, and hence, the vehicle may include two rear wheels. Whether or not the vehicle includes the body cover that covers the body frame 21 is not a matter of question. As to the power source, an electric motor may be used in place of an engine.

When referred to in relation to the "direction" and the "member" in the present invention, the term "along" includes a case where the direction and the member are inclined within the range of ±40 degrees. When referred to in relation to the "direction" in the present invention, the term "extend" also includes a case where the direction is inclined within the range of ±40 degrees.

The upper middle axis M1 and the lower middle axis M4 may be referred to as a middle axis as a general term therefor. The upper cross portion 51 and the lower cross portion 52 may be referred to as a cross portion as a general term therefor. The right side portion 54 and the left side portion 53 may be referred to as a side portion as a general term therefor.

In the preferred embodiments of the present invention, the link mechanism 5 may further include a cross portion in addition to the upper cross portion 51 and the lower cross portion 52. The upper cross portion 51 and the lower cross portion 52 are so called only because they are disposed relatively at an upper position and a lower position relatively. The upper cross portion 51 does not imply an uppermost cross portion in the link mechanism 5. The upper cross portion may indicate a cross portion positioned lower than an uppermost cross portion but is positioned higher than a different cross portion. The lower cross portion 52 does not imply a lowermost cross portion in the link mechanism. The lower cross portion may indicate a cross portion positioned higher than a lowermost cross portion but is positioned lower than a different cross portion. In addition, the cross portion may include three portions including a middle portion supported on the body frame, a right portion that supports the right side portion, and a left portion that supports the left side portion and the right cross portion and left cross portion that are divided transversely. In this manner, the upper cross portion and the lower cross portion may include a plurality of portions as long as they still provide the link function. The link mechanism only has to include the upper portion and the lower portion.

Additionally, in the preferred embodiments described above, the lower cross portion 52 is described as including two portions that are the flat plate-shaped rear lower cross portion 52a2 and the portion that includes the integral flat plate-shaped front lower cross portion 52a1 and the connecting portions 52b that connects the portion 52a1 and the rear lower cross portion 52a2 together. For example, by preparing the flat plate-shaped rear lower cross portion 52a2, the flat plate-shaped front lower cross portion 52a1, and the two connecting portions 52b as four independent portions, the lower cross portion 52 may be defined by these four portions.

When exerting the test forces, it is preferable that the test forces are exerted in such a state that the vehicle is fixed in the upright state. The forward direction in relation to the direction of the upper right axis indicates a direction directed from the rear portion to the front portion of the vehicle. The rearward direction in relation to the direction of the upper right axis indicates a direction directed from the front portion to the rear portion of the vehicle. The upper right axis, the lower right axis, the upper left axis, and the lower left axis are parallel or substantially parallel to one another. Because of this, the forward direction in relation to the direction of the upper right axis, the forward direction in the direction of the lower right axis, the forward direction in relation to the upper left axis, and the forward direction in relation to the lower left axis are the same or substantially the same in direction. The rearward direction in relation to the direction of the upper right axis, the rearward direction in the direction of the lower right axis, the rearward direction in relation to the upper left axis, and the rearward direction in relation to the lower left axis are the same or substantially the same in direction.

The test forces may be exerted directly on the bearings. Additionally, forces may be exerted directly to the side portion so that the test forces are eventually exerted on the bearings. The test force exerting method is not limited to these methods, as long as a method enables the test forces to be exerted on the bearings. The test forces may be exerted on the bearings by way of portions other than the side portion.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are permitted.

The present invention can be embodied in many different forms. The disclosure herein should be recognized as providing the preferred embodiments of the principle of the present invention. Based on the understanding that the preferred embodiments that are described and/or illustrated herein are not intended to limit the present invention thereto, several preferred embodiments are described and illustrated herein.

Several illustrated preferred embodiments of the invention are described herein. The present invention is not limited to the various preferred embodiments that are described herein. The present invention can include every preferred embodiment that includes equivalent elements, modifications, deletions, combinations (for example, combinations of the characteristics of the various preferred embodiments), improvements and/or alterations that those skilled in the art to which the present invention pertains can think of. Matters limited by claims should be construed widely based on terms that are used in the claims and should not be limited to the preferred embodiments described in this description or the prosecution of this patent application. Those preferred embodiments should be construed as non-exclusive. For example, in this disclosure, such terms as "preferred," "preferable" and "good" are non-exclusive terms and mean that "it is preferred but does not limit the present invention thereto," "it is preferable but does not limit the present invention thereto" and "it is good but does not limit the present invention thereto," respectively.

This patent application claims priority to Japanese Patent Application No. 2012-277219 filed on Dec. 19, 2012 and Japanese Patent Application No. 2012-277220 filed on Dec. 19, 2012, the contents of which are each incorporated herein by reference in their entirety.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle driven by power from a power source, the vehicle comprising:
   a left front wheel and a right front wheel that are steerable and spaced apart in a left-and-right direction as seen from a front of the vehicle;
   a right shock absorbing device that supports the right front wheel at a lower portion thereof and configured to absorb an upward displacement of the right front wheel in an up-and-down direction of a body frame;
   a left shock absorbing device that supports the left front wheel at a lower portion thereof and configured to absorb an upward displacement of the left front wheel in the up-and-down direction of the body frame;
   a link mechanism including:
      a right side portion that supports an upper portion of the right shock absorbing device so as to turn about a right steering axis that extends in the up-and-down direction of the body frame;
      a left side portion that supports an upper portion of the left shock absorbing device so as to turn about a left steering axis parallel or substantially parallel to the right steering axis;
      an upper cross portion including a right end portion that supports an upper portion of the right side portion via an upper right bearing so as to turn about an upper right axis that extends in a front-and-rear direction of the body frame, a left end portion that supports an upper portion of the left side portion thereof via an upper left bearing so as to turn about an upper left axis parallel or substantially parallel to the upper right axis, and a middle portion supported on the body frame via an upper middle bearing so as to turn about an upper middle axis parallel or substantially parallel to the upper right axis and the upper left axis; and a lower cross portion includes a right end portion that supports a lower portion of the right side portion via a lower right bearing so as to turn about a lower right axis parallel or substantially parallel to the upper right axis, a left end portion that supports a lower portion of the left side portion thereof via a lower left bearing so as to turn about a lower left axis parallel or substantially parallel to the upper left axis, and a middle portion supported on the body frame via a lower middle bearing so as to turn about a lower middle axis parallel or substantially parallel to the upper middle axis;

a steering shaft supported on the body frame between the right side portion and the left side portion in a transverse direction of the body frame, including an upper end portion higher in the up-and-down direction of the body frame than the lower middle axis, and turnable about a middle steering axis that extends in the up-and-down direction of the body frame;

a handlebar provided at the upper end portion of the steering shaft; and a turn transfer mechanism configured to transfer a turning motion of the steering shaft corresponding to an operation of the handlebar to the right shock absorbing device and to the left shock absorbing device; wherein in the link mechanism:

the upper cross portion has a different volume than the lower cross portion; and a displacement of the upper cross portion resulting when a forward or rearward test force in a direction of the upper right axis is exerted on the upper right bearing with the lower cross portion removed and the upper cross portion mounted, a displacement of the upper cross portion resulting when a force equal or substantially equal in magnitude and direction as the test force is exerted on the upper left bearing with the lower cross portion removed and the upper cross portion mounted, a displacement of the lower cross portion resulting when a force the same in magnitude and direction as the test force is exerted on the lower right bearing with the upper cross portion removed and the lower cross portion mounted, and a displacement of the lower cross portion resulting when a force the same in magnitude and direction as the test force is exerted on the lower left bearing with the upper cross portion removed and the lower cross portion mounted are equal or substantially equal to one another.

2. The vehicle according to claim 1, wherein the upper cross portion is made of a material that is different from a material from which the lower cross portion is made.

3. The vehicle according to claim 1, wherein the upper cross portion is made of a material that is identical to a material from which the lower cross portion is made.

4. The vehicle according to claim 1, wherein the body frame includes a link supporting portion that supports the upper cross portion and the lower cross portion in a turnable manner; and a volume of a front portion of the upper cross portion that is located farther forward than the link supporting portion in the direction of the upper right axis is different from a volume of a rear portion of the upper cross portion that is located farther rearward than the link supporting portion.

5. The vehicle according to claim 1, wherein the body frame includes a link supporting portion that supports the upper cross portion and the lower cross portion in a turnable manner; and a volume of a front portion of the lower cross portion that is located farther forward than the link supporting portion in the direction of the upper right axis is different from a volume of a rear portion of the lower cross portion that is located farther rearward than the link supporting portion.

6. The vehicle according to claim 1, wherein the upper cross portion has a volume smaller than a volume of the lower cross portion.

7. The vehicle according to claim 1, wherein the body frame includes a link supporting portion that supports the upper cross portion and the lower cross portion in a turnable manner; and a front portion of the upper cross portion that is located farther forward than the link supporting portion in the direction of the upper right axis has a volume smaller than a volume of a front portion of the lower cross portion that is located farther forward than the link supporting portion.

8. The vehicle according to claim 1, wherein the body frame includes a link supporting portion that supports the upper cross portion and the lower cross portion in a turnable manner; and the upper cross portion or the lower cross portion is provided either forward of or rearward of the link supporting portion, but is not provided both forward and rearward of the link supporting portion.

9. The vehicle according to claim 1, wherein a front end of the upper cross portion is located at a position that is different from a position where a front end of the lower cross portion is located in the direction of the upper right axis.

10. The vehicle according to claim 1, wherein a rear end of the upper cross portion is located at a position that is different from a position where a rear end of the lower cross portion is located in the direction of the upper right axis.

11. The vehicle according to claim 1, wherein the body frame includes a link supporting portion that supports the upper cross portion and the lower cross portion in a turnable manner; and the link supporting portion supports the steering shaft in a turnable manner.

12. The vehicle according to claim 1, wherein the body frame includes a link supporting portion that supports the upper cross portion and the lower cross portion in a turnable manner; and the upper cross portion includes an upper front portion positioned farther forward than the link supporting portion in the direction of the upper right axis and that is supported at the right end portion and the left end portion and supported at the middle portion, and an upper rear portion positioned farther rearward than the link supporting portion in the direction of the upper right axis and that is supported at the right end portion and the left end portion and supported at the middle portion.

13. The vehicle according to claim 1, wherein the body frame includes a link supporting portion that supports the upper cross portion and the lower cross portion in a turnable manner; and the lower cross portion includes a lower front portion positioned farther forward than the link supporting portion in the direction of the lower right axis and that is supported at the right end portion and the left end portion and supported at the middle portion, and a lower rear portion positioned farther rearward than the link supporting portion in the direction of the lower right axis and that is supported at the right end portion and the left end portion and supported at the middle portion.

* * * * *